(12) United States Patent
Spinella et al.

(10) Patent No.: US 12,042,876 B2
(45) Date of Patent: Jul. 23, 2024

(54) RESISTANCE WELDING FASTENER, APPARATUS AND METHODS

(71) Applicant: Arconic Inc., Pittsburgh, PA (US)

(72) Inventors: Donald J. Spinella, Greensburg, PA (US); Daniel Bergstrom, Sarver, PA (US)

(73) Assignee: Howmet Aerospace Inc., Pittsburg, PA (US)

(*) Notice: Subject to any disclaimer, the term of this patent is extended or adjusted under 35 U.S.C. 154(b) by 290 days.

(21) Appl. No.: 16/369,117

(22) Filed: Mar. 29, 2019

(65) Prior Publication Data

US 2019/0224774 A1 Jul. 25, 2019

Related U.S. Application Data

(62) Division of application No. 14/315,698, filed on Jun. 26, 2014, now Pat. No. 10,293,428.

(Continued)

(51) Int. Cl.
*B23K 11/00* (2006.01)
*B21D 39/02* (2006.01)
(Continued)

(52) U.S. Cl.
CPC ........ *B23K 11/0066* (2013.01); *B21D 39/028* (2013.01); *B23K 11/185* (2013.01);
(Continued)

(58) Field of Classification Search
CPC .............. B23K 11/0066; B23K 35/286; B23K 35/0288; B23K 35/284; B23K 35/28
(Continued)

(56) References Cited

U.S. PATENT DOCUMENTS 1,296,651 A * 3/1919 Gravell ................ B23K 11/002
219/94
3,219,790 A * 11/1965 Johnson ................ F16B 37/061
219/93

(Continued)

FOREIGN PATENT DOCUMENTS

JP 07214338 * 8/1995
JP H07214338 A * 8/1995

(Continued)

OTHER PUBLICATIONS

"Main Alloys Cast and Chemical Composition", downloaded from http://www.sssmile.com.tw on Jul. 12, 2021 (Year: 2016).*

*Primary Examiner* — Thien S Tran
(74) *Attorney, Agent, or Firm* — Greenberg Traurig, LLP

(57) ABSTRACT

An apparatus and method for fastening dissimilar metals like steel and aluminum utilizes a steel rivet and a spot welding machine. The rivet and metals are stacked and the heat from the welder's electric current softens the lower melting point aluminum allowing the rivet to penetrate the aluminum and weld to the steel layer. The fastener may be used to join stacks with several layers of different materials and may be used to apply a threaded socket or stud made from steel or titanium to an aluminum or magnesium alloy structure. Layers of non-conductive materials like plastic and ceramics may also be affixed to a conductive layer using the fastener made from a compatible material that extends through a pilot hole.

19 Claims, 13 Drawing Sheets

Related U.S. Application Data

(60) Provisional application No. 61/839,473, filed on Jun. 26, 2013.

(51) Int. Cl.
  *B23K 11/18* (2006.01)
  *B23K 11/20* (2006.01)
  *B23K 35/02* (2006.01)
  *B23K 35/28* (2006.01)
  *F16B 5/04* (2006.01)
  *F16B 5/08* (2006.01)
  *F16B 37/06* (2006.01)

(52) U.S. Cl.
  CPC ...... *B23K 35/0255* (2013.01); *B23K 35/0288* (2013.01); *B23K 35/28* (2013.01); *B23K 35/284* (2013.01); *B23K 35/286* (2013.01); *F16B 5/08* (2013.01); *F16B 37/061* (2013.01); *B23K 11/18* (2013.01); *B23K 11/20* (2013.01); *F16B 5/04* (2013.01)

(58) Field of Classification Search
  USPC ......... 219/56, 92, 93, 98, 99, 108, 110, 113, 219/118
  See application file for complete search history.

(56) References Cited

U.S. PATENT DOCUMENTS

| | | | | |
|---|---|---|---|---|
| 4,430,034 | A * | 2/1984 | Fujikawa | B23P 19/062 29/432 |
| 4,447,700 | A * | 5/1984 | Cohen | B23K 11/252 219/110 |
| 4,482,795 | A * | 11/1984 | Hinden | B23K 9/201 219/98 |
| 6,037,559 | A * | 3/2000 | Okabe | B23K 11/115 219/91.23 |
| 6,291,792 | B1 * | 9/2001 | Fussnegger | B23K 11/20 219/118 |
| 2009/0294410 | A1 * | 12/2009 | Iwase | B21J 15/08 219/91.23 |
| 2011/0097142 | A1 * | 4/2011 | Bassler | B23K 11/0046 403/337 |
| 2013/0309520 | A1 * | 11/2013 | Lang | B32B 15/01 428/594 |
| 2015/0144602 | A1 * | 5/2015 | Draht | B23K 20/02 228/141.1 |

FOREIGN PATENT DOCUMENTS

| | | | | |
|---|---|---|---|---|
| JP | | 2010223304 A | * 10/2010 | ............ F16B 37/061 |
| WO | WO-2013178542 A1 | | * 12/2013 | ............ B21J 15/025 |

* cited by examiner

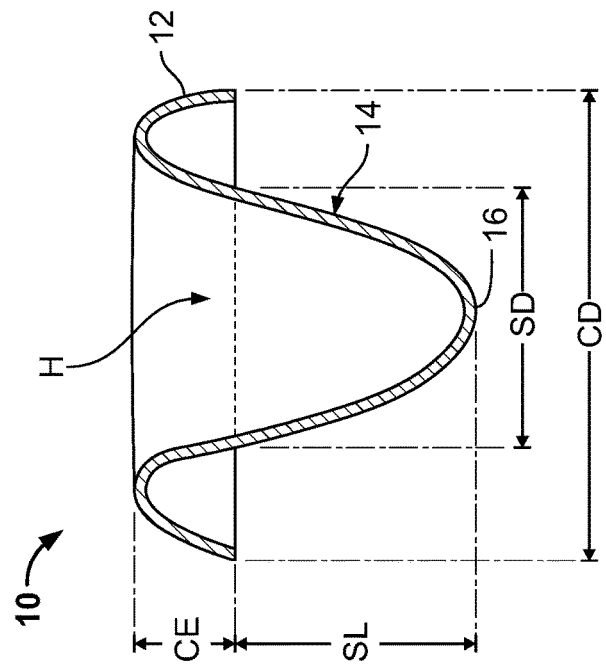
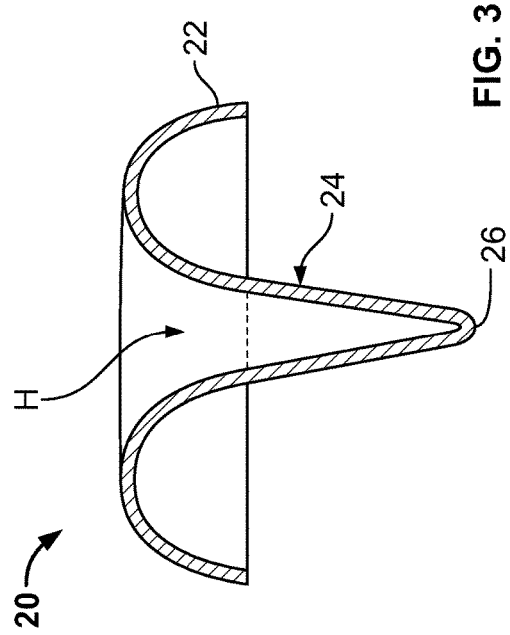
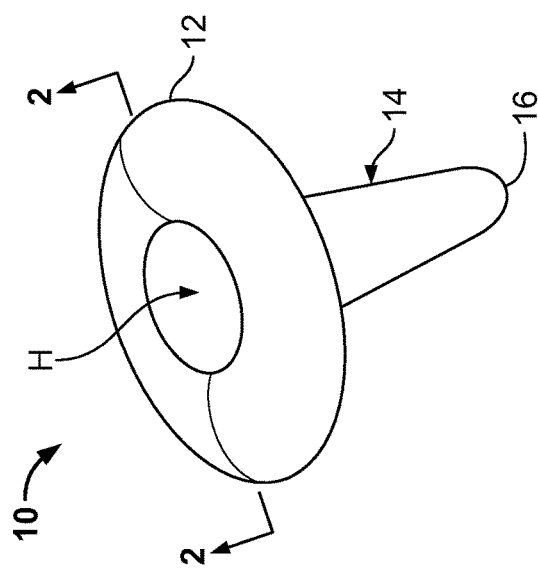
FIG. 2
FIG. 3
FIG. 1

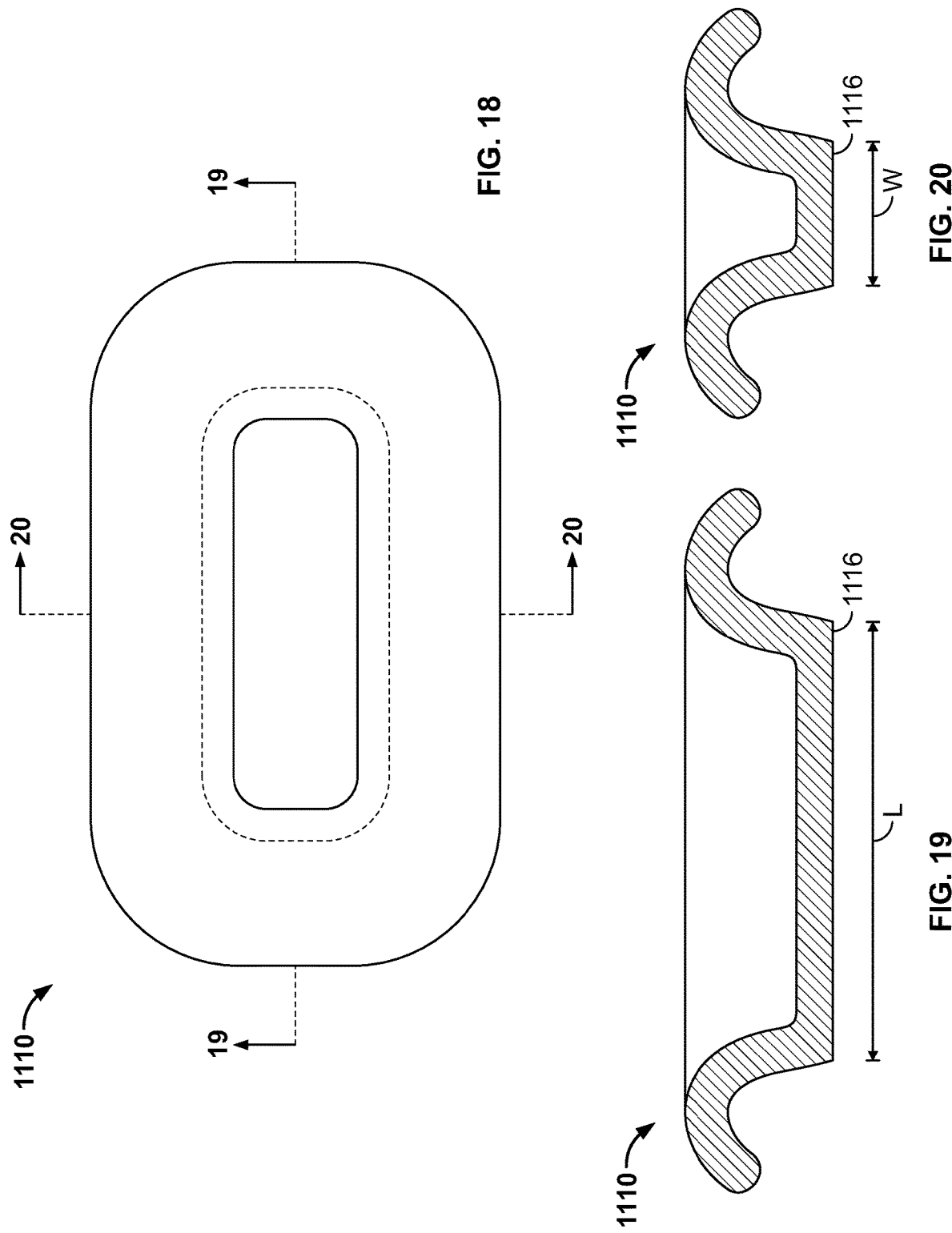

RESISTANCE WELDING FASTENER, APPARATUS AND METHODS

CROSS REFERENCE TO RELATED APPLICATIONS

This application is a divisional of U.S. patent application Ser. No. 14/315,698 entitled "RESISTANCE WELDING FASTENER, APPARATUS AND METHODS", filed Jun. 26, 2014, which claims the benefit of U.S. Provisional Application No. 61/839,473, entitled, "RESISTANCE WELDING FASTENER, APPARATUS AND METHODS, filed Jun. 26, 2013, which is incorporated in its entirety herein by reference.

FIELD

The present invention relates to fasteners, fastening apparatus and methods for fastening parts and more particularly, for fastening metals, including dissimilar metals.

BACKGROUND

Various fasteners, apparatus and methods for joining and assembling parts or subunits are known, such as welding, riveting, threaded fasteners, etc. In some instances, there is a need to cost effectively join aluminum parts, subunits, layers, etc., to other parts, subunits, layers, etc. made from other materials, such as steel (bare, coated, low carbon, high strength, ultra high strength, stainless), titanium alloys, copper alloys, magnesium, plastics, etc. Solutions for these fastening problems include mechanical fastener/rivets in combination with an adhesive and/or a barrier layer to maintain adequate joint strength while minimizing corrosion, e.g., due to the galvanic effect present at a junction of dissimilar metals. Direct welding between aluminum and other materials is not commonly employed due to intermetallics generated by the aluminum and the other materials, which negatively affect mechanical strength and corrosion resistance. In cases where direct welding is employed, it is typically some type of solid-state welding (friction, upset, ultrasonic, etc.) or brazing/soldering technology in order to minimize the intermetallics, but the mechanical performance of such joints is sometimes poor or only applicable to unique joint geometries.

In the automotive industry, the incumbent technology for joining steel to steel is resistance spot welding (RSW), due to cost and cycle time considerations (less than 3 seconds per individual joint and which may be performed robotically). Known methods for joining aluminum to steel, include: use of conventional through-hole riveting/fasteners, self-pierce riveting (SPR), use of flow drill screws (FDS or by trade name of EJOTS), friction stir spot welding/joining (FSJ), friction bit joining (FBJ), and use of adhesives. Each of these processes is more challenging than steel-to-steel resistance spot welding (RSW). For example, when high strength aluminum (above 240 MPa) is coupled to steel using SPR, the aluminum can crack during the riveting process. Further, high strength steels (>590 MPa) are difficult to pierce, requiring the application of high magnitude forces by large, heavy riveting guns. FSJ is not widely employed in the automotive industry since joint properties (primarily peel and cross tension) are low compared to SPR. In addition, FSJ requires very precise alignment and fitup. As the thickness of the joint increases, the cycle times for the process can increase dramatically where a 5 mm to 6 mm joint stack-up may require 7 to 9 seconds of total processing time, which is well above the 2 to 3 second cycle time of RSW when fabricating steel structures. FBJ employs a bit which is rotated through the aluminum and is then welded to the steel. This process requires very precise alignment and fit-up similar to FSJ and high forging forces are required for welding to steel. FDS involves rotating a screw into the work pieces, plasticizing one of the sheets, which then becomes interlocked with the screw's thread. FDS is typically applied from a single side and requires alignment with a pilot hole in the steel sheet, complicating assembly and adding cost. Alternative fasteners, apparatus and methods for joining and assembling parts or subunits therefore remain desirable.

SUMMARY

The disclosed subject matter relates to a method for fastening a first electrically conductive material to a second electrically conductive material using electrical resistance welding by placing the first and second materials together in physical and electrical contact, the first material having a lower melting point than the second material; placing an electrically conductive fastener that is weldable to the second material and which has a higher melting point than the first material in physical and electrical contact with the first material to form an electrically conductive stack inclusive of the fastener, the first material and the second material; applying an electrical potential across the stack, inducing a current to flow through the stack and causing resistive heating, the resistive heating causing a softening of the first material; and urging the fastener through the softened first material toward the second material. After the fastener contacts the second material the fastener is welded to the second material.

In accordance with another aspect of the present disclosure, the first material includes at least one of aluminum, copper and magnesium and alloys thereof.

In accordance with another aspect of the present disclosure, the second material includes at least one of steel, titanium, alloys thereof and Inconel.

In accordance with another aspect of the present disclosure, the fastener is made from at least one of steel, titanium, alloys thereof and Inconel.

In accordance with another aspect of the present disclosure, a portion of the fastener covers an upwelled portion of the first material that is displaced when the fastener is urged through the first material.

In accordance with another aspect of the present disclosure, the first material and the second material are in the form of layers In accordance with another aspect of the present disclosure, the layers are sheet metal.

In accordance with another aspect of the present disclosure, the second material is in the form of a structural member.

In accordance with another aspect of the present disclosure, the electrical potential is applied in the course of direct resistance welding.

In accordance with another aspect of the present disclosure, the electrical potential is applied in the course of indirect resistance welding.

In accordance with another aspect of the present disclosure, the electrical potential is applied in the course of series resistance welding.

In accordance with another aspect of the present disclosure, the stack includes a plurality of layers of material having a melting point less than a melting point of the second material and less than a melting point of the fastener.

In accordance with another aspect of the present disclosure, the plurality of layers includes a plurality of layers of aluminum alloy.

In accordance with another aspect of the present disclosure, the plurality of layers includes a layer of aluminum alloy and a layer of magnesium alloy.

In accordance with another aspect of the present disclosure, the second material is a second fastener.

In accordance with another aspect of the present disclosure, the fastener and second fastener clamp the first material there between.

In accordance with another aspect of the present disclosure, the first material includes a plurality of layers, the fastener and second fastener clamping the plurality of layers together.

In accordance with another aspect of the present disclosure, the second fastener has a threaded socket.

In accordance with another aspect of the present disclosure, the threaded socket extends through the first material.

In accordance with another aspect of the present disclosure, the second fastener has a threaded stud.

In accordance with another aspect of the present disclosure, the fastener and the second fastener are identical.

In accordance with another aspect of the present disclosure, further comprising the step of applying a corrosion barrier between at least one of the fastener, the first layer and the second layer prior to the step of applying.

In accordance with another aspect of the present disclosure, the barrier is non-conductive and further comprising the step of making a hole in the barrier through which the current can flow during the step of applying.

In accordance with another aspect of the present disclosure, the electric potential is applied by electrodes, at least one of which has a tip with a shape that is complementary to the shape of the fastener, and capable of receiving the fastener thereon and further comprising the step of coupling the fastener on the at least one tip prior to the step of placing.

In accordance with another aspect of the present disclosure, the same fastener has the capability to fasten a range of thicknesses of the first material to the second material by deforming to a selected degree during the step of welding.

In accordance with another aspect of the present disclosure, the fastener has a cap having an initial configuration and a final configuration and further comprising the step of deforming the cap from the initial configuration to the final configuration during said steps of applying, urging and welding.

In accordance with another aspect of the present disclosure, the fastener has a hollow and further comprising the step of inserting a portion of an electrode tip into the hollow during the step of placing.

In accordance with another aspect of the present disclosure, the fastener has a cap portion and a shaft portion, the shaft portion extending through the first layer during the step of urging.

In accordance with another aspect of the present disclosure, the cap is capable of capturing material extruded from the first layer during the steps of urging and welding.

In accordance with another aspect of the present disclosure, the cap abuts against the first layer after completion of the step of welding.

In accordance with another aspect of the present disclosure, current flow is variable during the steps of applying urging and welding.

In accordance with another aspect of the present disclosure, a time period of current flow is variable during the steps of applying urging and welding.

In accordance with another aspect of the present disclosure, further including stamping the fastener from a sheet prior to the step of placing the fastener.

In accordance with another aspect of the present disclosure, the fastener is at least one of galvanized, electroplated, zinc electroplated, aluminized or galvannealed.

In accordance with another aspect of the present disclosure, the fastener is at least one of stainless steel, aluminum alloy, magnesium alloy, copper alloy, titanium alloy and Inconel.

In accordance with another aspect of the present disclosure, a method for fastening a first material to a second electrically conductive material using electrical resistance welding, includes:

forming a pilot hole in the first material; placing the first and second materials together in physical contact; placing an electrically conductive fastener that is weldable to the second material in electrical contact with the second material by extending the fastener through the pilot hole; applying an electrical potential across the fastener and the second material, inducing a current to flow through the fastener and the second material causing resistive heating, the resistive heating causing a the fastener to weld to the second material.

In accordance with another aspect of the present disclosure, the fastener and the second material are at least one of steel, aluminum, magnesium, titanium, and alloys thereof and the first material is at least one of plastic, plastic composite, metal-plastic laminate, ceramic, painted metal, aluminum, steel, titanium, magnesium, alloys thereof and Inconel.

In accordance with another aspect of the present disclosure, a fastener for fastening a first electrically conductive material to a second electrically conductive material using electrical resistance welding has a cap, a shaft extending from the cap and having an end distal to the cap. The fastener, when placed in a stack including first and second electrically conductive materials positioned in electrical contact, the first material having a lower melting point than the second material and subjected to an electrical potential applied across the stack, capable of conducting an electrical current that passes through the stack, the current causing resistive heating, softening the first material, the shaft capable of penetrating the first material and welding to the second material at the end distal to the cap, the first material being captured between the cap and the second material after the end is welded to the second material.

In accordance with another aspect of the present disclosure, the fastener is symmetric about a rotational axis and has a hollow shaft with a U-shaped cross section, the cap extending from the shaft at the open end of the U-shape forming a reversely curved peripheral lip.

In accordance with another aspect of the present disclosure, the fastener is symmetric about a rotational axis and has a hollow shaft with a squared U-shaped cross section, the cap extending from the shaft at the open end of the U-shape forming a reversely curved peripheral lip.

In accordance with another aspect of the present disclosure, the fastener is symmetric about a rotational axis and has a hollow shaft with a diverging U-shaped cross section, the cap extending from the shaft at the open end of the U-shape forming a reversely curved peripheral lip, the thickness of the walls of the fastener being substantially constant in the cap, shaft and end, the end forming a flat surface.

In accordance with another aspect of the present disclosure, the fastener is symmetric about a rotational axis and has a hollow shaft with a diverging U-shaped cross section, the cap extending from the shaft at the open end of the U-shape forming a reversely curved peripheral lip, the end forming a flat surface, the thickness of the walls of the end being greater than the thickness of the shaft and cap.

In accordance with another aspect of the present disclosure, the fastener is symmetric about a rotational axis and has a hollow shaft with a diverging U-shaped cross section, the cap extending from the shaft at the open end of the U-shape forming a reversely curved peripheral lip, the thickness of the walls of the fastener forming the fastener being substantially constant in the cap, shaft and end, the end forming a radiused surface.

In accordance with another aspect of the present disclosure, the fastener is symmetric about a rotational axis and has a hollow shaft with a diverging U-shaped cross section, the cap extending from the shaft at the open end of the U-shape forming a reversely curved peripheral lip, the shaft proximate the end having at least one spline extending from an exterior surface thereof.

In accordance with another aspect of the present disclosure, the fastener is asymmetric about a rotational axis, having a length measured perpendicular to the direction of insertion greater than a width measured perpendicular to the direction of insertion and having a hollow shaft with a diverging U-shaped cross section, the cap extending from the shaft at the open end of the U-shape forming a reversely curved peripheral lip.

In accordance with another aspect of the present disclosure, the fastener is symmetric about a rotational axis and has a hollow shaft with two diverging U-shaped cross section portions conjoined at a central downwardly directed cusp, the cap extending from the shaft at the open end of the U-shapes forming a reversely curved peripheral lip, the end being ring shaped.

In accordance with another aspect of the present disclosure, the fastener is symmetric about a rotational axis and has a hollow shaft with two diverging U-shaped cross section portions conjoined at a central threaded fastener portion, the cap extending from the shaft at the open end of the U-shapes forming a reversely curved peripheral lip, the end being ring shaped.

In accordance with another aspect of the present disclosure, the threaded fastener portion is a threaded socket.

In accordance with another aspect of the present disclosure, the threaded socket is open-ended and extends through an opening in the first material.

In accordance with another aspect of the present disclosure, the threaded fastener portion has a threaded stud.

In accordance with another aspect of the present disclosure, the fastener has an upper part with the cap, shaft and end and a lower part having the threaded socket, the upper part penetrating the first material and welding to the lower part.

In accordance with another aspect of the present disclosure, the fastener has an upper part with the cap, shaft and end and a lower part having the threaded stud, the threaded stud extending from a flange, the upper part penetrating the first material and welding to the flange.

In accordance with another aspect of the present disclosure, at least a portion of the shaft is solid in cross-section.

In accordance with another aspect of the present disclosure, the fastener is made from at least one of steel, titanium, magnesium, aluminum, copper, alloys thereof and Inconel.

In accordance with another aspect of the present disclosure, a fastener for fastening a first electrically non-conductive material having a pilot hole therein to a second electrically conductive material using electrical resistance welding, features a cap, a shaft extending from the cap and having an end distal to the cap. The fastener is capable of inserting through the pilot hole when the first and second materials are placed in a stack, the fastener being formed from electrically conductive material and capable when subjected to an electrical potential applied across the fastener and the stack of conducting an electrical current that passes through the stack, the current causing resistive heating, welding the fastener to the second material at the end distal to the cap and capturing the first material between the cap and the second material after the end is welded to the second material.

BRIEF DESCRIPTION OF THE DRAWINGS

For a more complete understanding of the present disclosure, reference is made to the following detailed description of exemplary embodiments considered in conjunction with the accompanying drawings.

FIG. 1 is a perspective view of a fastener in accordance with an embodiment of the present disclosure.

FIG. 2 is a cross-sectional view of the fastener of FIG. 1 taken along section line 2-2 and looking in the direction of the arrows.

FIG. 3 is a cross sectional view of a fastener like that shown in FIG. 2, but having different dimensions.

FIGS. 18-20 are plan, and cross-sectional views, respectively, of a fastener in accordance with an alternative embodiment of the present disclosure.

DETAILED DESCRIPTION OF EXEMPLARY EMBODIMENTS

Figure 4:
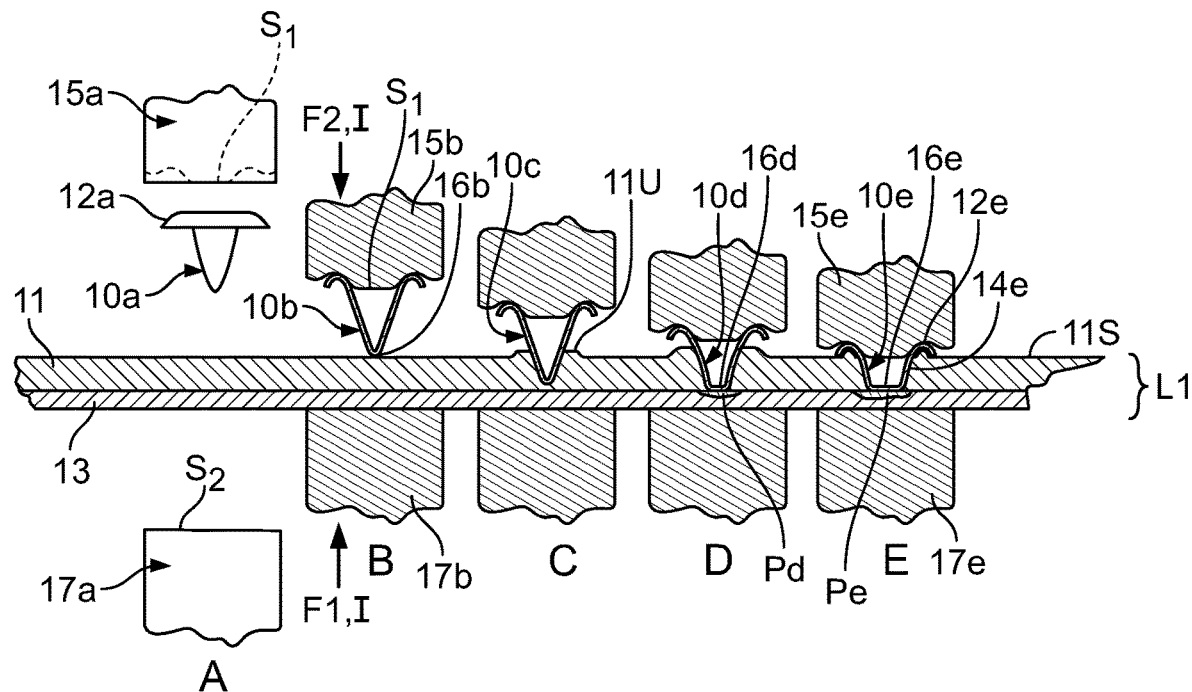
FIG. 4 is a diagrammatic view sequentially showing the insertion of a fastener in accordance with an embodiment of the present disclosure through a first layer and being welded to a second layer.

FIGS. 1 and 2 show a fastener 10 having a peripheral cap 12 and a tapered shaft 14 that has a bluntly pointed end 16 opposite to the cap 12. An internal hollow H extends through the cap 12 and into the shaft 14. The fastener 10 may be made from a conductive metal, e.g., steel or titanium, that is capable of supporting a resistance spot welding process. The cap 12 has an edge-to-top dimension CE, and diameter CD. The stem has diameter SD and length from cap 12 to end 16 of SL. As described below, these dimensions may be varied depending upon the use to which the fastener 10 is put, e.g., the thickness and type of parts that the fastener 10 is used to join. In one example, the diameter CD may be in the range of about 4 mm to 16 mm, the length SL in the range of about 3 mm to 10 mm, CE in the range of about 0.5 to 3.0 mm and SD in the range of about 2 to 12 mm. FIG. 3 shows a fastener 20, like that of FIG. 1, but having different dimensions, i.e., having a thinner shaft 24 with a more severely pointed end 26.

FIG. 4 shows the insertion of a fastener 10a in accordance with an embodiment of the present disclosure through a first layer of metal 11, e.g., an aluminum alloy, and being welded to a second layer of metal 13, e.g., a steel alloy, to form a laminate structure L1. This is shown in sequential stages labeled A-E. As shown at stage A, this process may be conducted at a conventional spot welding station having opposing electrodes, the tips 15a and 17a of which are shown spaced apart from the metal sheets/layers 11, 13, allowing the fastener 10a to be inserted between the tip 15a and the layer 11. The tip 15a may have a surface S1 with a shape that accommodates, supports, shapes and/or retains the fastener 10a through the welding process. At stage B, opposing forces F1, F2 exerted by the conventional welding machine (not shown) to move the tips 15b, 17b towards one another, capture the fastener 10b and the layers 11, 13 there between and an electric current I is applied through the conjunction of these elements. The forces F1, F2 and current I are applied throughout the stages B-E and the magnitude and duration of each may be varied depending upon the requirements at each stage. For example, the current I required to heat/plasticize the aluminum in stage B may be less than that required to weld steel to steel as occurs in stages D and E. Similarly, the forces F1 and F2 may be varied to accommodate changing processing requirements.

The current I heats each of the fastener 10b, and the layers 11, 13 to a temperature at which the aluminum layer 11 plasticizes and can be displaced/pierced by the fastener 10b. The aluminum layer 11 is heated resistively by current I and also through conduction from both the fastener 10b and the layer 13. The fastener 10b and the layer 13 have lower heat and electrical conductivity than the aluminum layer 11, such that a low current typically achieved with a resistance spot welder suitable for making resistance spot welds in steel can be used to generate the heat required to plasticize the aluminum layer, as well as make the weld to layer 13, as described below. Since aluminum has a lower melting point than the steel layer 13 or the fastener 10b, which in this example is also steel, the aluminum layer 11 reaches a plastic state permitting displacement by the fastener 10b and allowing the end 16b of the fastener 10b to penetrate the aluminum layer 11. As shown at stage C, the insertion of the fastener 10c into the aluminum layer 11 causes an upwelling 11U of displaced plasticized aluminum rising above the original upper surface 11S of the layer 11. As shown at stage D, the fastener 10d penetrates the layer 11 completely and comes into contact with the steel layer 13 whereupon the end 16d of the fastener 10d begins to melt and flatten and a zone Pd of molten metal begins to form at the interface of the layer 13 and the end 16d of the fastener. The zone Pd is the weld material or "nugget" where the metal of the fastener 10d and the layer 13 liquify and commingle. As shown at stage E, the continued application of converging forces F1, F2 and current I result in a further blunting and melting of the end 16e and a portion of the length of the stem 14e, along with the enlargement of the molten zone Pe. Stage E also shows the cap 12e has descended down to the level of the upper surface 11S, covering and sealing the upwelling 11U attributable to the insertion of the fastener 10e fully into the layer 11 of aluminum.

After having accomplished stage E, the forces F1, F2 and current I can be removed and the tips 15e and 17e, withdrawn. The foregoing process can be conducted with barrier layers, e.g., an adhesive layer of surface pre-treatment or paint/primer (not shown) applied to the surface 11S and/or between the layers 11, 13, so long as the barrier layer does not prevent the current I from flowing to create electrical resistance heating. In this manner, the contact between dissimilar metals of layers 11,13 can be reduced, along with unwanted galvanic interaction and corrosion. The partial melting of the fastener 10 during the penetration and welding phases of the process allows the fastener 10a to accommodate a range of thicknesses of layer 11.

The cap 12a of the fastener 10a defines an annular recess that can receive, capture and seal off aluminum and intermetallics generated from the penetration (stages B and C) and welding (stages D and E) as the cap 12a "bottoms out" on the surface 11S of the aluminum layer 11. This containment of the aluminum and intermetallics may significantly improve the corrosion performance and joint strength attributable to the fastener 10a. The cap 12a can be formed in the fastener 10a prior to the welding process or can be formed in-situ during welding. As described more fully below in reference to FIG. 8, the geometry of the fastener 10a and its interaction with/retention by tip 15a and surface S1 enables single-sided welding (welding from one side without an electrode contacting member 13 directly in opposition to the electrode tip 15a to provide a counter force). The tip 15a, may be shaped to be grasped by the fastener 10a via a resilience or spring loading of the fastener 10a which retains the fastener 10a on the tip 15a during welding, but detach once the weld has been completed. For example, the tip 15 may have a peripheral ledge or concavity that an upper edge of the fastener 10a resiliently and removable grasps.

The fastener 10 may be formed from thin sheet steel, e.g., about 1 mm to 4 mm in thickness, but can be made in any given thickness as determined by the thickness of the layers 11, 13, with greater thickness in the layers requiring greater thickness of the fastener. Alternatively, the shaft 14 of the fastener 10 may be solid or semi-solid. Regardless of the thickness/hollowness of the fastener (density for a given surface area) the shaft 14 may be proportioned to collapse when the end 16 is welded to the sheet 13, such that the cap contacts the upper surface 11S of sheet 11 and/or seals off any intermetallics and upwelled areas 11U when welding is completed (stage E).

The final dimensions of the weld zone Pe will depend upon the starting and final dimensions of the fastener shaft 14e, i.e., diameter, length and the thickness of the shaft walls. The greater the dimensions of the fastener shaft 14e, the greater the dimensions of the weld zone Pe. In one example, attaching sheet 11 composed of aluminum of thickness 0.5 mm to 4.0 mm to sheet 13 composed of steel of 0.5 mm to 3.0 mm thickness, a weld diameter in the range from 2 mm to 8 mm would exhibit beneficial shear and peel strength properties.

Figure 5:
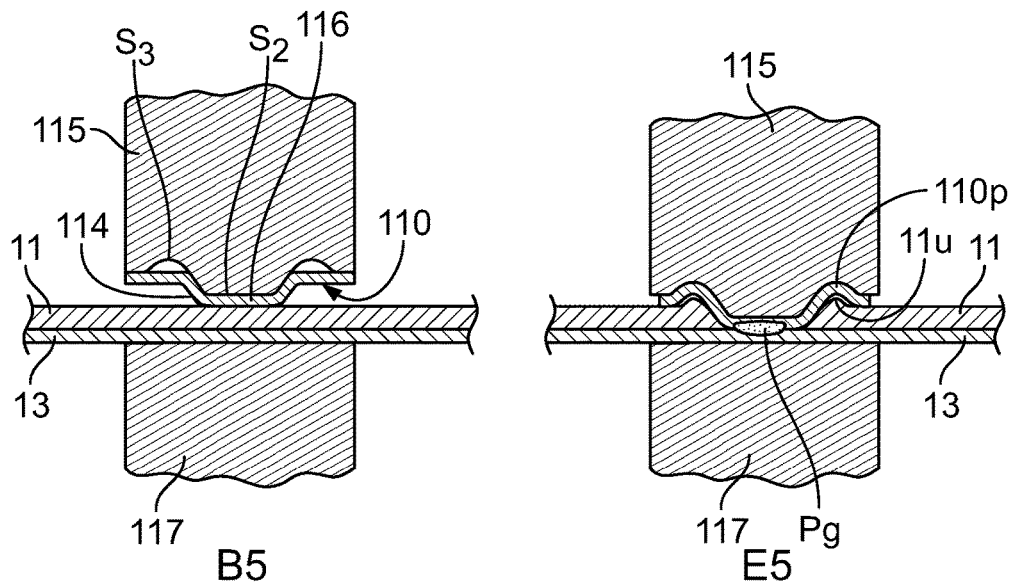
FIG. 5 is a diagrammatic view sequentially showing the insertion of a fastener in accordance with another embodiment of the present disclosure through a first layer and being welded to a second layer.

In order to minimize weight in a finished welded product made with the fasteners 10 of the present disclosure, the gauge of the sheet employed for making the fastener 10 may be reduced. As a result, the reduced sidewall strength of the fastener shaft 14 may cause it to prematurely collapse during the welding process. In order to support the shaft 14, the electrode 15a can be formed to extend into the hollow H to partially or fully engage the inner surface of the shaft 14 within the hollow H. FIG. 5 shows an alternative fastener 110 in two phases in the welding process, viz., phase B5 prior to extruding through the layer 11 and phase E5—after welding. An electrode tip 115 having a surface S2 that supports the end 116 of the fastener 110, allows the end 116 to be pushed through the layer 11 without the end 116 or shaft (sidewall) 114 deforming. The tip 115 has a concave annular surface S3 that can receive and form/shape a corresponding area of the fastener periphery 110p in response to the fastener 110 being pressed against the upwelling 11U when the fastener is pressed fully through layer 11 to form the weld zone Pg as shown in phase E5.

Figure 6:
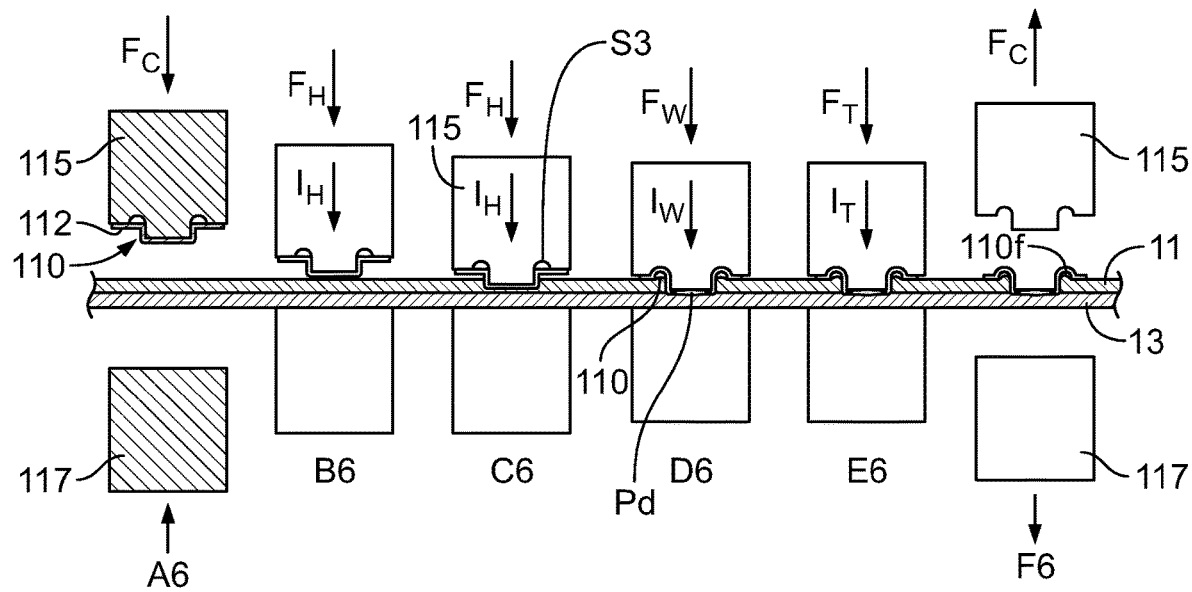
FIG. 6 is a diagrammatic view sequentially showing the insertion of a fastener in accordance with another embodiment of the present disclosure through a first layer and being welded to a second layer.

FIG. 6 shows a more comprehensive sequence of steps A6-F6 in use of the fastener 110 to perform spot welding through an upper layer 11, e.g., an aluminum sheet, to fasten the upper layer 11 to a lower layer 13, e.g., a steel sheet. As can be appreciated, this process could also be called "resistance spot fastening" or "resistance spot riveting," in that the fastener 110 could be described as a rivet that is plunged through the layer 11, making a hole in the layer 11 and joining to the layer 13 by welding, the cap 112 of the fastener clamping the layer 11 against the layer 13. As the fastener 110 penetrates the top layer 11 and engages the bottom layer 13, the concave annular surface S3 in the electrode tip 115 encapsulates and seals against the layer 11, in particular, the upwelling 11U. In one example, stage B6 and C6 may have an associated force $F_H$ of a magnitude of, e.g., from 100 to 2000 pounds and a current level $I_H$ of a magnitude of, e.g., from 2,500 to 24,000 amperes, that is appropriate for plasticizing the first layer 11 of aluminum having a thickness of 2 mm and welding to a second layer 13 of 780 MPa galvanized coated steel with a thickness of 1.0 mm, by a fastener of low-carbon steel with a 16 mm overall diameter, a total height of 3 mm and average wall thickness of 1.0 mm. These magnitudes of force and current are just exemplary and are dependent upon the dimensions and compositions of the fastener 110 and the layers 11 and 13. The duration of time to transition from stage B6 to C6 may be in the order of 0.2 to 6.0 secs. In one example, a force of e.g., 100 lbs, a current of 2,500 A and a cycle time of 6 seconds may be used. Increases in the force and current may result in shorter cycle times. Pursuing this example further and using the same dimensions and properties of the fastener 110 and layers 11, 13, stage D6 may utilize an associated force $F_W$ of a magnitude of, e.g., from 400 to 800 pounds and a current level $I_W$ of a magnitude of, e.g., from 6,000 to 18,000 amperes, that is appropriate for initiating the melting of the fastener 110 and the lower level 13 to form a molten weld zone Pd. The magnitude of force $F_W$ may be changed to a force $F_T$ of a magnitude of, e.g., from 400 to 1,000 pounds and a current level $I_T$ of a magnitude of, e.g., from 3,000 to 12,000 amperes at stage E6 to form an expanded weld zone to temper the weld and to render it with an average cross-sectional diameter of 4 mm to 6 mm. The completion of stage D6 may take, e.g., 0.1 to 0.5 secs. At stage F6, the first and second electrode tips 115, 117 may be withdrawn. As can be appreciated, since the upwelling 11U forces the cap 112 to conform to the surface S3, establishing a close relative fit, there may be some resistance to withdrawing the first tip 115 from the fastener 110f at stage F6. In some applications, it may also be preferred to utilize a pre-formed fastener to reduce withdrawal force, cycle time and to reduce the amount of welding force $F_W$ needed to shape the cap 112 to conform to the surface S3 and the upwelling 11U.

Figure 7:
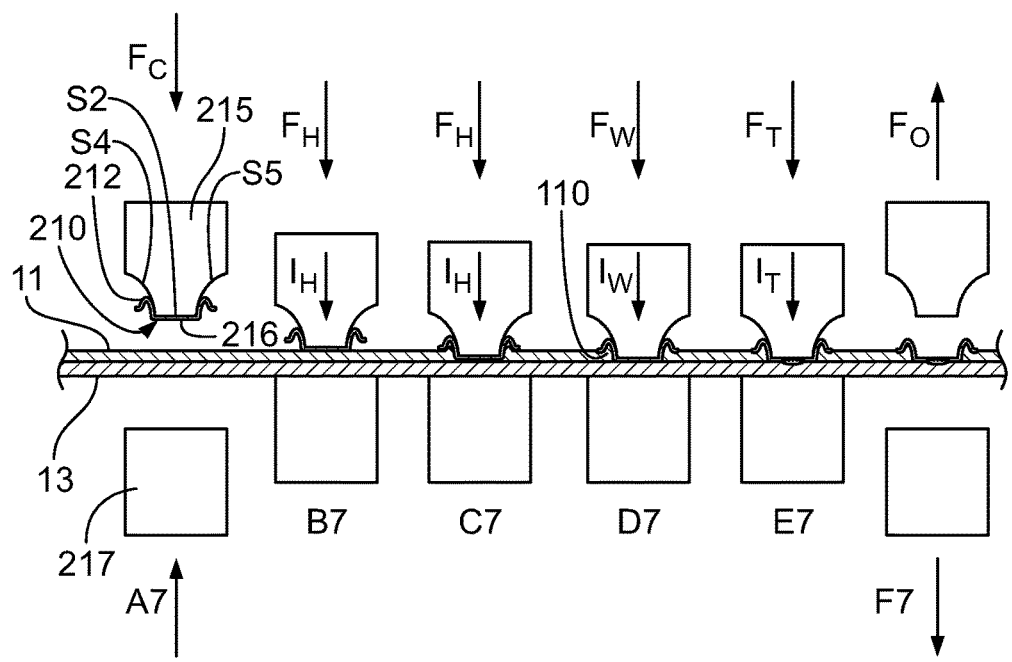
FIG. 7 is a diagrammatic view sequentially showing the insertion of a fastener in accordance with another embodiment of the present disclosure through a first layer and being welded to a second layer.

FIG. 7 shows a sequence of steps A7-F7 in use of a fastener 210 to perform spot welding through an upper layer 11, e.g., an aluminum sheet, to fasten the upper layer 11 to a lower layer 13, e.g., a steel sheet. The fastener 210 is preformed to have a shape similar to the fastener 110 after it has been formed by the welding force shown in stages D6 and E6 of FIG. 6, such that the upper section can encapsulate and seal the top surface without the need to be formed by the electrode during the welding process. Since the fastener 210 is preformed, the electrode tip 215 does not require the concave annular surface S3 to shape the cap 212 to accommodate and seal against upwelling 11U of the first layer 11 proximate where it is penetrated by the fastener 210. As a result, the electrode tip 215 can taper (be radiused at surfaces S4, S5 to the surface S2 supporting the end 216 of the fastener 210. This allows the concentration of heating, welding, and tempering forces $F_H$, $F_W$, $F_T$ as well as the heating, welding, and tempering currents $I_H$, $I_W$, $I_T$ over a smaller area, allowing reduced force and current to accomplish the tasks of penetration, welding and tempering.

Figure 8:
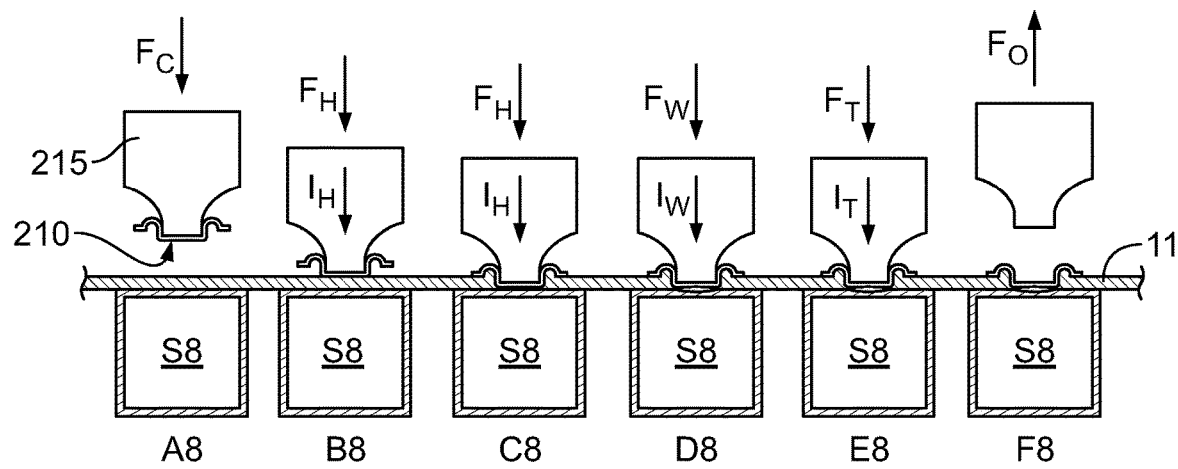
FIG. 8 is a diagrammatic view sequentially showing the insertion of a fastener like that shown in FIG. 7 through a first layer and being welded to a tubular member via single sided access.

FIGS. 4-7 depict direct access welding wherein the resistance welding electrodes, e.g., 15a, 17a, clamp the work pieces/welding stack 10a, 11, 13 from opposing sides. As shown in FIG. 8, spot welding using a fastener 10, 20, 110, 210, in accordance with the present disclosure can be conducted from one side using indirect welding. A structure S8, such as a steel beam or any other type of structure may be connected to one pole of a source of electrical potential for conducting welding. The other pole provides electrical power to welding tip 215 to supply electrical power for heating at stages B8 and C8, welding at D8 and tempering at E8. Indirect welding is commonly done on steel, but is difficult to conduct on aluminum to aluminum joints. Since the present disclosure permits welding with a fastener made from materials other than aluminum, it facilitates the conjunction of an aluminum layer 11, e.g., an aluminum sheet, to a steel structure S8, such as a steel tube.

Figure 9:
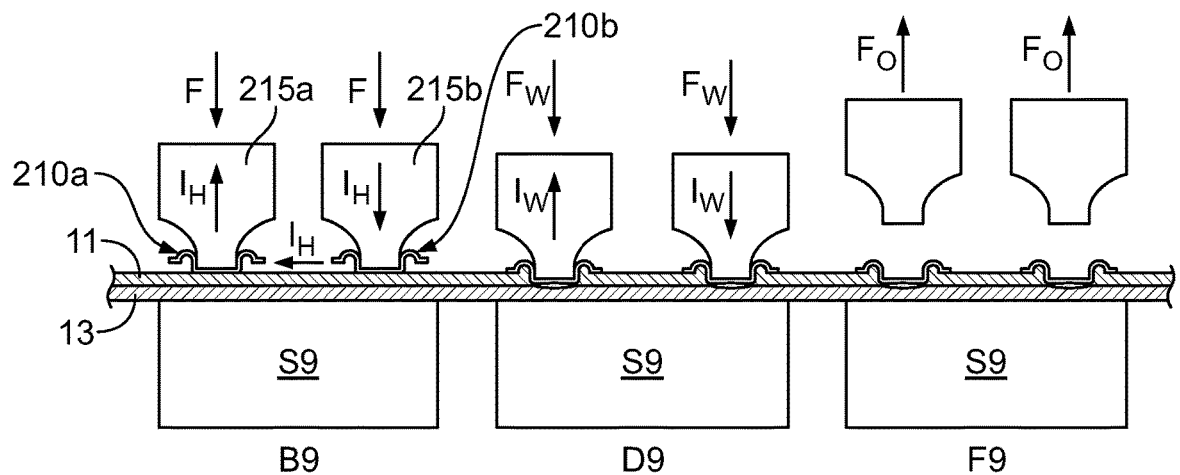
FIG. 9 is a diagrammatic view sequentially showing the insertion of a fastener like that shown in FIG. 7 through a first layer and being welded to a second layer in series weld formation.

In series welding, two or more electrodes approach from a single side. Multiple welds are then produced as the welding current flows between multiple guns in a series fashion. FIG. 9 shows that the welding process and apparatus of the present disclosure can be utilized in conducting series welding fasteners 210a and 210b to join layers/members 11, 13 in a single welding operation. Current $I_H$ passes through electrode 215a, layers 11, 13, through a conductive backer bar S9, then back through layers 11, 13 to electrode 215b. As before, the current $I_H$ heats layer 11 allowing penetration by fasteners 210a, 210b, the fasteners welding on contact with layer 13. The overall process is similar to that explained above, but only stages B9, D9 and F9 are shown. Series welding is not typically conducted on aluminum but is commonly done using steel materials. Since the present disclosure permits welding with a fastener made from materials other than aluminum, it facilitates the conjunction of an aluminum layer 11, e.g., an aluminum sheet, to a steel layer/sheet 13 or structure, such as a steel tube or box structure via series welding.

While the foregoing examples refer to a fastener 10, 20, 110, 210 made from steel, the fastener 10, 20, 110, 210 may be made from other materials, such as titanium, magnesium, coated steel, electroplated steel or stainless steel, as long as the layer, e.g., 13, to which it is welded to is compatible for welding. The first layer 11 and succeeding (second) layer(s) 13 may also be varied in composition and number. For example, the first layer may be aluminum, magnesium, copper or alloys thereof. The first layer 11 may also be a plurality of layers of any of the foregoing, e.g., two layers of aluminum, two layers of magnesium or three or more layers of magnesium, copper or aluminum. Optionally, more than one type of material may be used in the plurality of layers. In order to penetrate an intervening layer like layer 11, the fastener 10 . . . 210 should be made of a material with a higher melting point than the intervening layer(s) 11 penetrated during the heating/penetrating phase, e.g., B6, C6 (FIG. 6). In order to conduct the welding phase, e.g., D6, the fastener 110 material must be compatible with the layer to which it is to be resistance welded, e.g., layer 13. For example, if the layer 13 is made from high strength (>590 MPa) galvanized steel, then the fastener 110 may be made, e.g., from standard, low-carbon steels, high strength steels (>590 MPa) or stainless steel grades.

Figure 10:
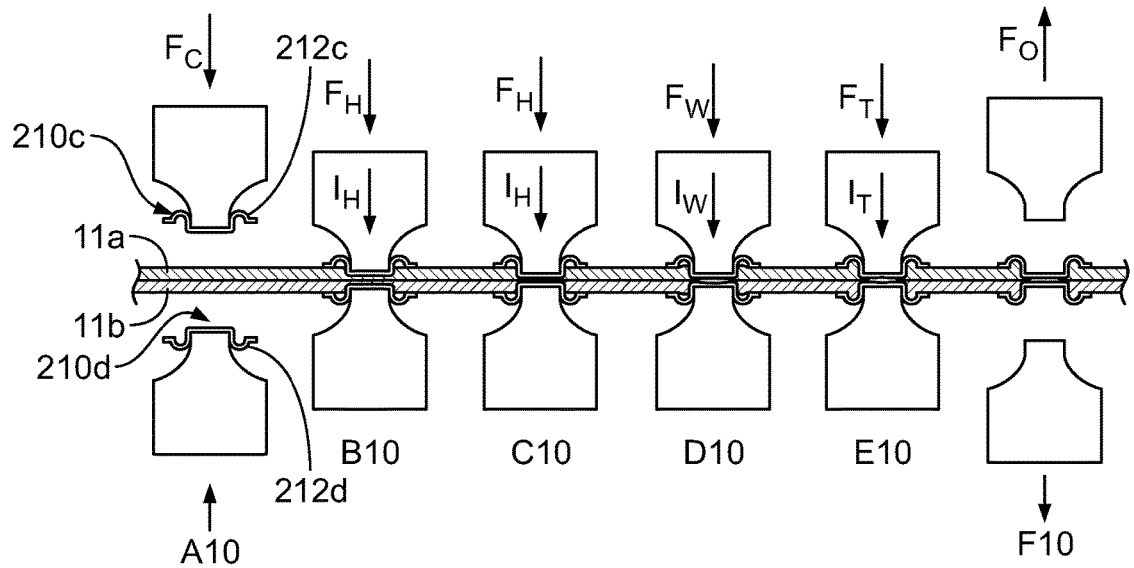
FIG. 10 is a diagrammatic view sequentially showing the insertion of opposed fasteners like those shown in FIG. 7 through first and second layers and being welded to each other.

FIG. 10 shows that a fastener 210c may be used with an opposing fastener 210d to conjoin a pair of layers 11a, 11b, e.g., made from aluminum or magnesium, by spot welding to one another, such that the caps 212c, 212d capture the layers 11a, 11b there between. The procedure shown in stages A10 to F10 mimics the above-described procedure, e.g., as described in reference to FIGS. 4-7, in that electrical resistance is used in heating, penetration of the layers and welding, but instead of the fasteners 210c, 210d reaching a layer 13 to which they are welded, they each penetrate the intervening layers 11a, 11b in opposite directions, meet and weld to each other.

Figure 11:
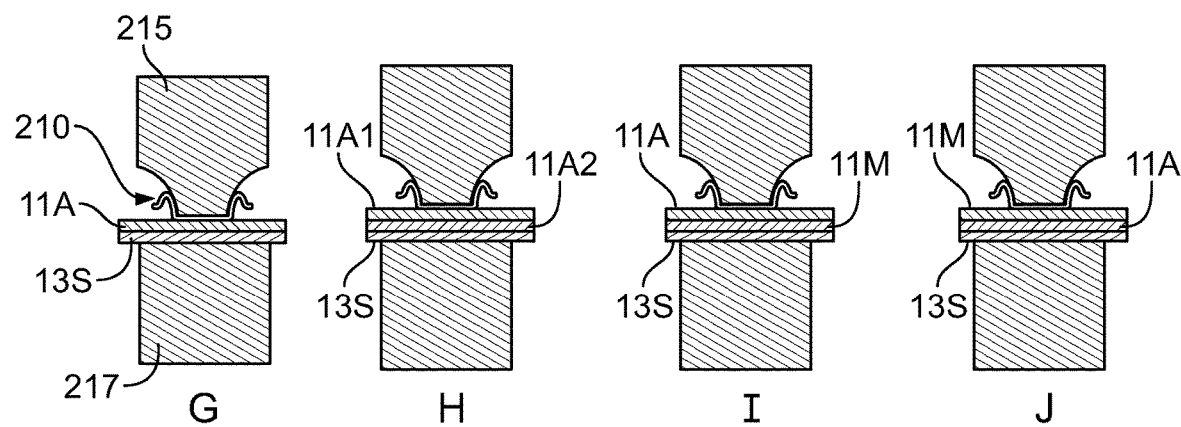
FIG. 11 is a diagrammatic view showing fasteners like those shown in FIG. 7 positioned next to different stacks of material layers to be fastened and prior to insertion or welding.

FIG. 11 shows that various combinations of layers may be joined in accordance with an embodiment of the present disclosure. As shown in combination G, the stack-up of materials may be aluminum 11A and steel 13S like the stack-up shown and described above in relation to FIG. 7 at stage B7. As described above, the fastener 210 can be pushed through the aluminum layer 11A and welded to the steel layer 13S. In one alternative, one or both of the layers 11A1, 11A2 may be magnesium/magnesium alloy. Combination H shows a stack-up of two layers of aluminum 11A1 and 11A2 with a steel layer 13S. As before, the fastener 210 can be pushed through the aluminum layers 11A1 and 11A2 and then welded to the steel layer 13S. Combination I shows a stack-up of a layer of aluminum 11A and a layer of magnesium 11M with a steel layer 13S. The fastener 210 can be pushed through the aluminum layer 11A and the magnesium layer 11M and then welded to the steel layer 13S. Combination J shows a stack-up of an outer layer of magnesium 11M an intermediate layer of aluminum 11A and a steel layer 13S. The fastener 210 can be pushed through the magnesium layer 11M and the aluminum layer 11A and then welded to the steel layer 13S. In each of the stack-ups shown in G, H, I and J, the fastener 210 may be used to secure the laminate structure shown. Other combinations of material, thicknesses and numbers of layers are possible to be secured by the fastener 210, 110, 20, 10 of the present disclosure.

Figure 12:
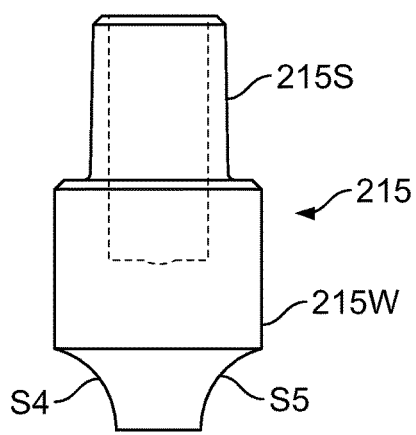
FIG. 12 is a side view of a spot welding cap in accordance with an embodiment of the present disclosure.

FIG. 12 shows a welding electrode tip 215 with a connector sleeve portion 215S and a welding portion 215W with radiused tapered surfaces S4 and S5. A tip like this is available from CMW Contacts Metal Welding www.cmwinc.com and is called a G-cap.

Figure 13A:
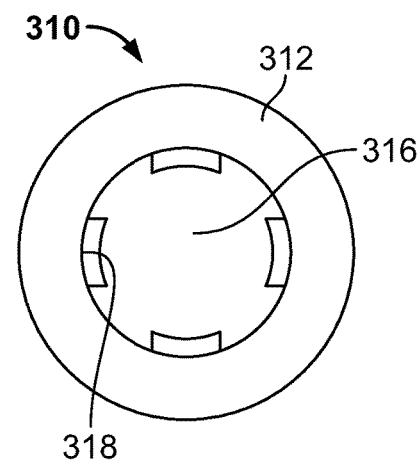
FIGS. 13a and 13b are plan and side views, respectively, of a fastener in accordance with another embodiment of the present disclosure.
Figure 13B:
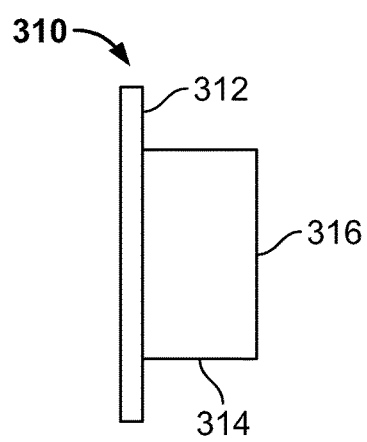

FIGS. 13a and 13b shows a cap nut repurposed to function as a fastener 310 in accordance with the present disclosure. The fastener 310 has a cap 312, a shaft 314 and an end 316. Lugs 318 for interacting with a mating tool 318 may be used to retain the fastener 310 on an electrode tip like tip 115 and may also be used to twist the fastener as it is pushed through an intermediate layer 11 and/or when it is welded to a layer 13.

Figure 14A:
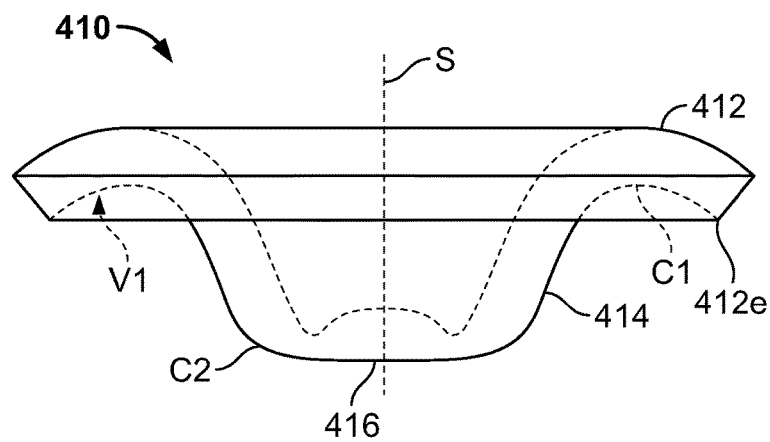
FIGS. 14a and 14b are side and plan views, respectively, of a fastener in accordance with another embodiment of the present disclosure.
Figure 14B:
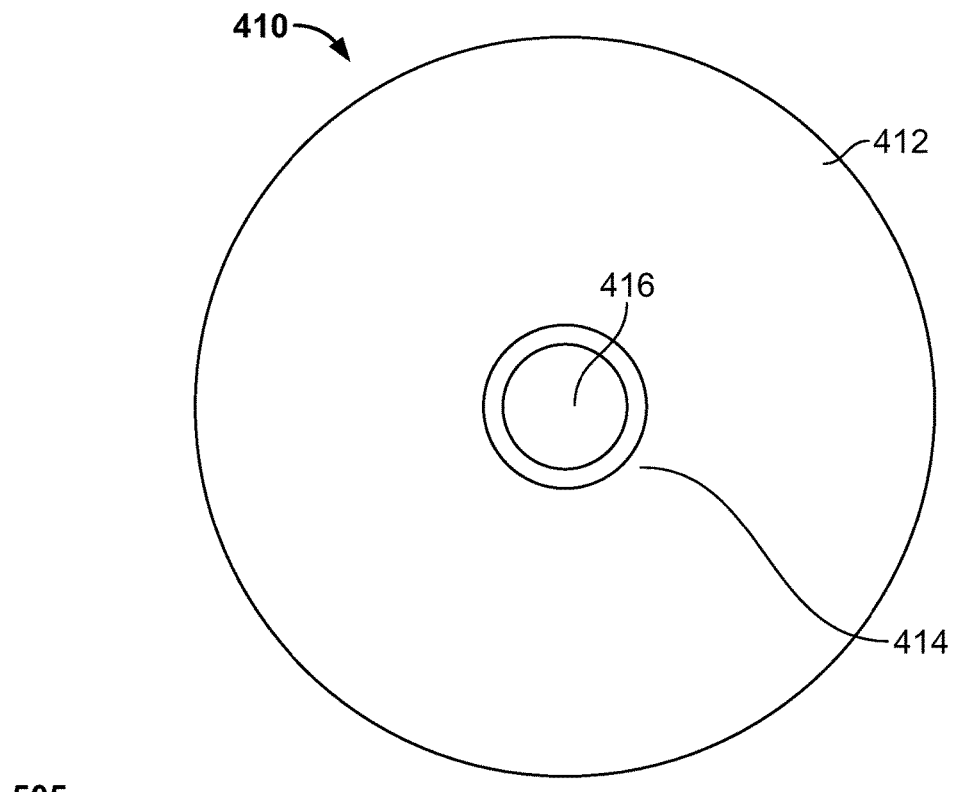
Figure 15:
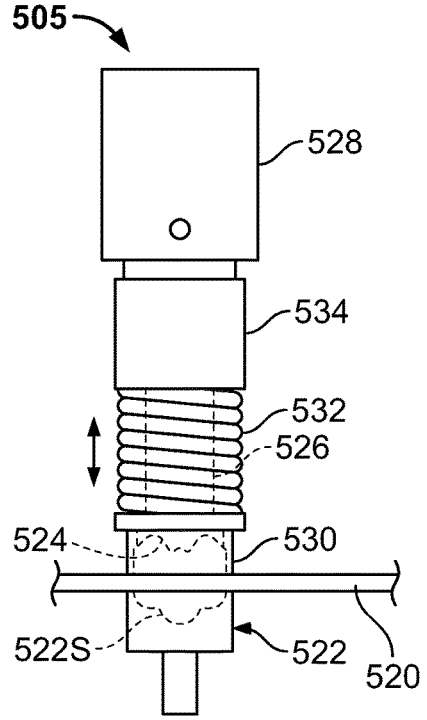
FIG. 15 is a side view of a fastener stamping tool in accordance with an embodiment of the present disclosure.

FIGS. 14a and 14b are side and plan views, respectively, of a fastener 410 in accordance with another embodiment of the present disclosure. The fastener 410 can be made as a stamping using a stamping tool and back-up die as shown in FIG. 15. The cap 412 transitions into the shaft 414 at curve C1 and the shaft 414 transitions into the end 416 at curve C2. The curve C1, when rotated about the axis of symmetry S of the fastener 410 and delimited by edge 412e and its projection on the shaft 414, circumscribes a volume V1 that can contain and seal off upwelling of the penetrated layer, e.g., as shown as 11U in FIG. 5.

FIG. 15 shows a fastener stamping tool 505 in accordance with an embodiment of the present disclosure. The stamping tool may be used to form fasteners like fastener 410 from stock material 520, e.g., a sheet of steel. The fastener stamping tool 505 has an upset die 522 with a forming surface 522S (shown in dotted lines). A shaping tool 524 (in dotted lines) driven by a punch 526 (shaft shown in dotted lines), which acts in conjunction with the upset die 522 to form a fastener 410 (FIGS. 14A,Bb) from the stock 520. In the embodiment shown, the shaping tool 524 both cuts the fastener 410 from the stock 520 and shapes it as it is driven down through the stock 520 by the punch 526. Alternatively, disk-shaped blanks (not shown) having the dimensions required to form a fastener 410 may be cut from the stock by a separate punch and loaded into a blank holder 530 before the punch 526 is driven down against the upset die 522 to shape the blank into the fastener 410. A spring 532 may be inserted between a retainer cap 534 and the blank holder 530 to return the punch 526 to a neutral position after a fastener 410 has been stamped out by the fastener stamping tool 505. The punch 526 may be coupled to a punch holder 528 that is driven mechanically, hydraulically or pneumatically in a conventional manner for actuating punches and presses.

Figure 16:
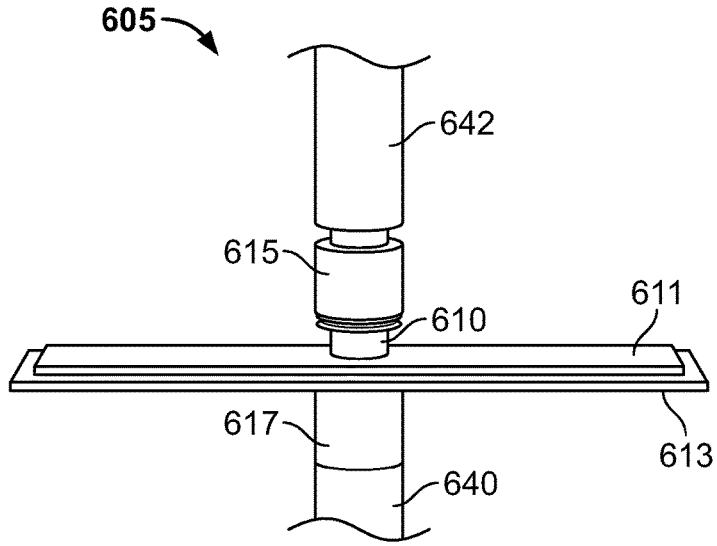
FIG. 16 is a perspective view of two metal sheets in a spot welding apparatus prior to applying a fastener in accordance with an embodiment of the present disclosure.

FIG. 16 shows welding stack-up 605 wherein a fastener 610 is positioned against first and second layers 611, 613 prior to penetration or welding. The first layer 611 may be an aluminum, magnesium or copper sheet and the second layer may be a steel, titanium or inconnel sheet. The layers 611, 613 and fastener 610 are clamped between first and second tips 615, 617 that are in electrical continuity with lower and upper electrodes 640, 642 of a commercially available electric spot welding machine, such as a 250 kVA welding station available from Centerline Welding, Ltd.

In one example of a welding operation conducted in accordance with the present disclosure, a commercially available 250 kVA AC resistance spot welding pedestal machine was employed to heat and plunge a fastener/rivet through an aluminum sheet and weld to a steel backing sheet. The upper electrode tip 615 was a commercially available electrode called a G-cap (similar to the tip 215 of FIG. 12) and the lower electrode tip 617 was a standard, flat faced (16 mm diameter, RWMA type C-Nose). A standard cap nut 610 as shown in FIGS. 13a and 13b was used for the rivet. The parts to join were 1.5 mm 7075-T6 aluminum alloy and 0.7 mm 270 MPa galvanized steel. The cap nut 610 was placed on the G-cap electrode 615 and then against the aluminum sheet 611 in the stackup as shown in FIG. 16. Current pulses about 1.5 secs. in duration at 9,000 amps were generated to cause the cap nut 610 to penetrate the aluminum sheet 611. After penetration, the cap nut 610 was welded to the steel with a current impulse around 15 kA for 0.166. A weld button, approximately 5 mm in diameter, between the steel cap nut and the 0.7 mm 270 MPa steel sheet was obtained.

Aspects of the present disclosure include low part distortion, since the layers to be fastened, e.g., 11, 13, are held in compression during the weld and the heat affected zone is primarily restricted to the footprint of the cap, e.g., 12 of the fastener 10. The fasteners, e.g., 10, 20, 110, 210, 310, 410, 610 form a volume relative to the first layer 11 to trap intermetallics or materials displaced by penetration of the fastener through the first layer 11. The fasteners, e.g., 10 . . . 610 can be used to fasten a range of layer thicknesses and number of layers of different kinds of materials, viz., by selecting a fastener of the appropriate dimensions and material composition. In addition, a given fastener 10 . . . 610 may be operable over a range of thicknesses due to the elasticity of the materials of which it is formed, as well as the shape of the fastener. For example, the cap 412 may elastically bend relative to the shaft 414 when the fastener 410 is used to accommodate various thicknesses and to resiliently press upon the layer(s), e.g., 11 when welded to layer 13. The resilient pressing of the cap 412 against a layer, e.g., 11 may contribute to establishing and maintaining a seal around the perimeter of the fastener 10 . . . 610 when it is in place.

The fastener 10 . . . 610 of the present disclosure may be applied through adhesives and/or other coatings applied between layers, e.g., 11, 13 and/or through coating applied to the top layer 11. The weld formed by use of the fastener, e.g., Pe in FIG. 4, does not penetrate the layer 13 nor disturb the surface of 13 opposite to the weld, preserving appearance, corrosion resistance and being water-tight. During fastener penetration, e.g., at stage C of FIG. 4 and the welding phase, stage D, the fastener 10c, 10d, 10e will continually collapse and expand along the weld zone Pd, Pe, pushing out intermetallics from the weld zone. The methodology and apparatus of the present disclosure is compatible with conventional RSW equipment developed for steel sheet resistance welding and the fastener, 10 . . . 610 can be made out of a variety of materials, such as, various steel grades (low carbon, high strength, ultra high strength, stainless), titanium, aluminum, magnesium, and copper. The fastener of the present disclosure may optionally be coated (galvanized, galvaneal, hot-dipped, aluminized, electroplated) to improve corrosion resistance.

As noted above, the fastener 10 . . . 610 of the present disclosure may be used via single-sided or two-side access welding. The fastener 10 . . . 610 does not require a pilot hole in the top sheet(s) made from aluminum and other conductors, but can also be used with a pilot hole in the aluminum or top sheet, allowing the fastener to extend through the top sheet(s) to reach the bottom sheet 13 prior to welding. Pilot holes may also be used to allow electrical flow through dielectric/non-conductive layers, such as adhesive layers or anti-corrosive coatings/layers. In addition, dielectric/insulator materials, such as plastics and plastic composites, including carbon fiber reinforced plastics, metal-to plastic laminates, e.g., of aluminum, magnesium or steel and plastic, such as Reynobond® available from Alcoa Architectural Products of Eastman, Georgia, fiberglass, SMC, thermoset, thermoplastics and ceramics, which would include glass, may be attached to steels via a steel fastener 10 . . . 610 that passed through a pilot hole in a layer of these types of materials and welded by electrical resistance welding to the steel layer. Plastics, plastic composites and ceramics may also be joined to an aluminum layer 13 via a fastener 10 . . . 610 made in whole or part from a compatible material, e.g., aluminum alloy. Plastics, plastic composites and ceramics may also be joined to a magnesium layer 13 via a fastener 10 . . . 610 made in whole or part from a compatible material, e.g., aluminum or magnesium alloy. Similarly, plastics, plastic composites and ceramics may also be joined to a titanium layer 13 via a fastener 10 . . . 610 made in whole or part from a compatible material, e.g., a titanium alloy. top layer(s) 11 that are coated with a non-conductive coating, such as primers, rust-proofing coatings, paint, and anodized layers, may also be joined to a weldable layer made from steel, aluminum, magnesium or titanium by extending a fastener 10 . . . 610 of the present disclosure through a pilot hole in the coated, non-conductive layer to extend to and weld to the weldable layer 13. This approach may be applied for joining a painted/coated, electrically non-conductive layer 11 of aluminum, steel, magnesium or titanium to a layer 13 of steel, magnesium, aluminum or titanium, in any combination, so long as the fastener 10 . . . 610 is made from a material compatible with welding to the layer 13. This approach is applicable to those industries, processes and manufactures where the layer (s) 11 to be joined to the weldable layer 13 is pre-painted. Pre-painting is common when joining dissimilar materials, such as aluminum and steel, to prevent galvanic corrosion. Allowing one of the two sheets 11, 13 to be coated prior to assembly would increase corrosion protection as compared to both sheets being uncoated or bare sheets.

The weld quality resulting from use of the fastener 10 . . . 610 can be tested in accordance with quality assurance measurements applied to the cavity left by the weld, i.e., by measuring the dimensions of the cavity. Ultrasonic NDE techniques may also be utilized on the backside, e.g., of layer 13 (steel side) to monitor the weld quality.

Compared to FDS (EJOTS), SPR, and SFJ, the apparatus used to apply the fastener 10 . . . 610 of the present disclosure has a smaller footprint, allowing access to tighter spaces. The apparatus and method of the present disclosure uses lower insertion forces as compared to SPR since the first layer 11 is heated/softened during the fastener insertion phase, e.g., see stage C of FIG. 4. The methods and apparatus of the present disclosure provide the ability to join high strength aluminums (which are sensitive to cracking during SPR operations) and to join to high and ultra high strength steels, since there is no need to pierce the steel metal with the fastener but rather the fastener is welded to it.

The apparatus and method of the present disclosure does not require rotating parts and is conducive to resolving part fit-up issues since the overall process is similar to conventional resistance spot welding (RSW) with respect to how the component layers/parts are fixtured. In addition, the application of the fastener 10 . . . 610 can be conducted quickly providing fast processing speeds similar to conventional RSW. The apparatus and methods of the present disclosure can be applied to use on both wrought and cast aluminum products and may be used to produce a compatible metal joint rather than a bimetallic weld as when welding aluminum to steel, which may have low joint strength. As noted above, the apparatus and methods of the present disclosure may be used to conjoin multiple layers of different materials, e.g., two or more layers of aluminum or magnesium to one layer of steel; one layer of aluminum to two layers of steel (FIGS. 22-27); or one layer of aluminum or magnesium to one layer of steel.

Figure 17A:
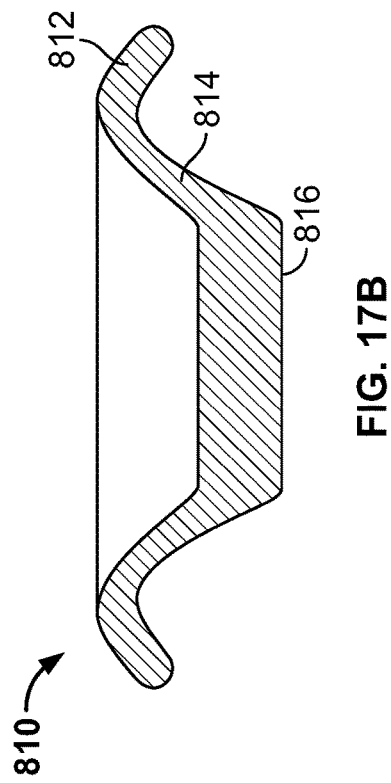
FIGS. 17a-17d are cross-sectional views of fasteners in accordance with alternative embodiment of the present disclosure.

FIG. 17a shows a cross-sectional view of a fastener 710 like fastener 410 of FIG. 14a, wherein the thickness of the cap 712, shaft 714 and end 716 are substantially of constant thickness. The end 716 is flat.

Figure 17B:
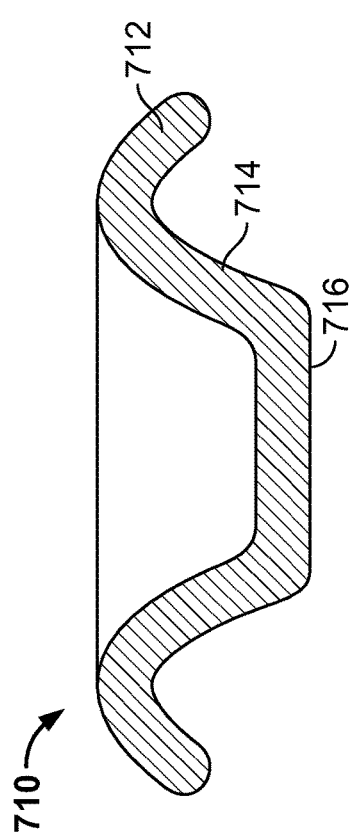

FIG. 17b shows a fastener 810 wherein the end 816 is flat and has a greater thickness than the shaft 814 of cap 812.

Figure 17C:
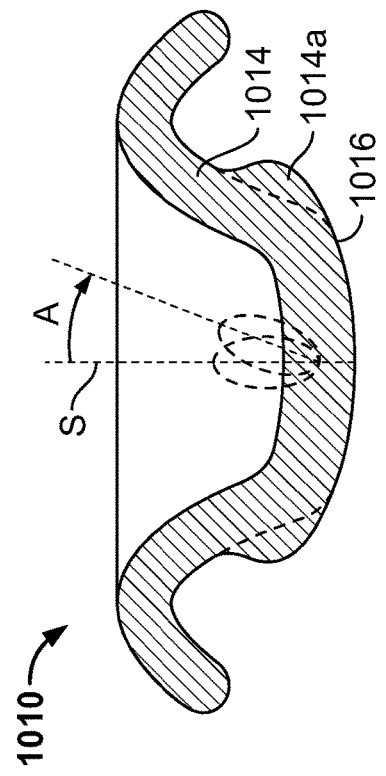

FIG. 17c shows a fastener 910 with a radiused end 916 having a constant thickness. In one example, the radius R is in the range of 1 to 6 inches.

Figure 17D:
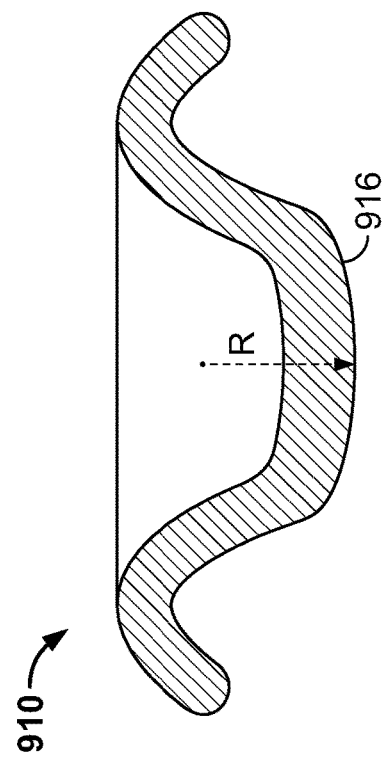

FIG. 17d shows a fastener 1010 having a radiused end 1016 and splines 1014s at the conjunction of the end 1016 and the shaft 1014. The splines 1014s may be aligned with the axis of symmetry/rotation S or disposed at an angle A relative thereto. The splines may be utilized to either guide the fastener in a particular direction, e.g., straight or in a spiral when the fastener is pressed through the layer 11 and/or may be used as an anti-rotation feature that prevent rotation of layer 11 relative to installed fastener 1010.

FIGS. 18-20 show a fastener 1110 having a length L greater than the width W thereof. In one example, the length L may be in the range 8 mm to 25 mm and the width in the range 4 mm to 8 mm.

Figure 21:
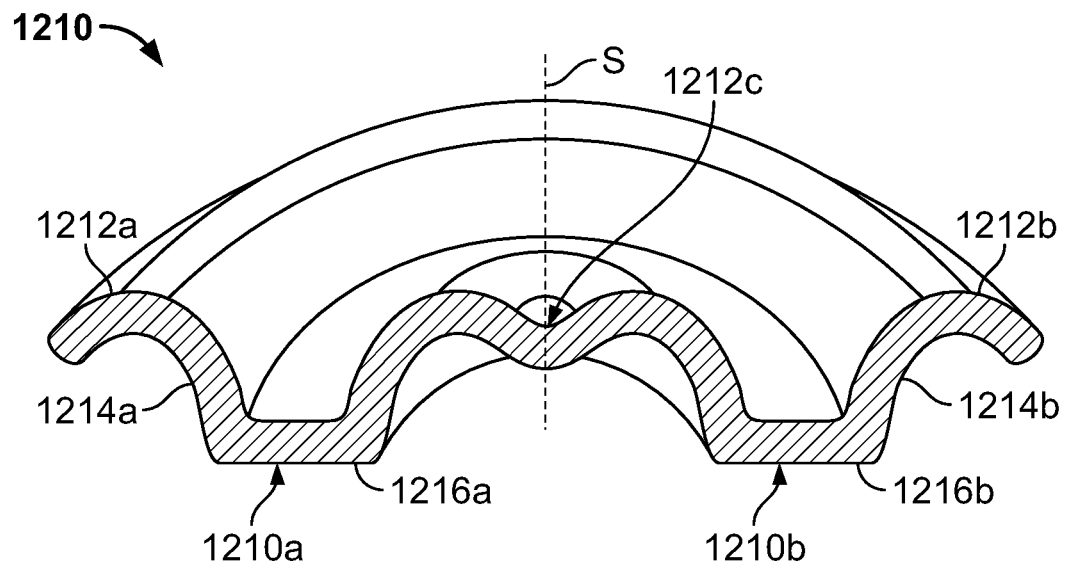
FIG. 21 is a cross-sectional view of a fastener in accordance with an alternative embodiment of the present disclosure.

FIG. 21 shows a fastener 1210 that in cross-section has left and right portions 1210a, 1210b that converge at 1212c. Fastener 1210 is a solid of rotation about line of symmetry/rotation S, such that the ends 1216a, 1216b form a continuous ring surface that may be welded to a substrate as further illustrated below.

Figure 22:
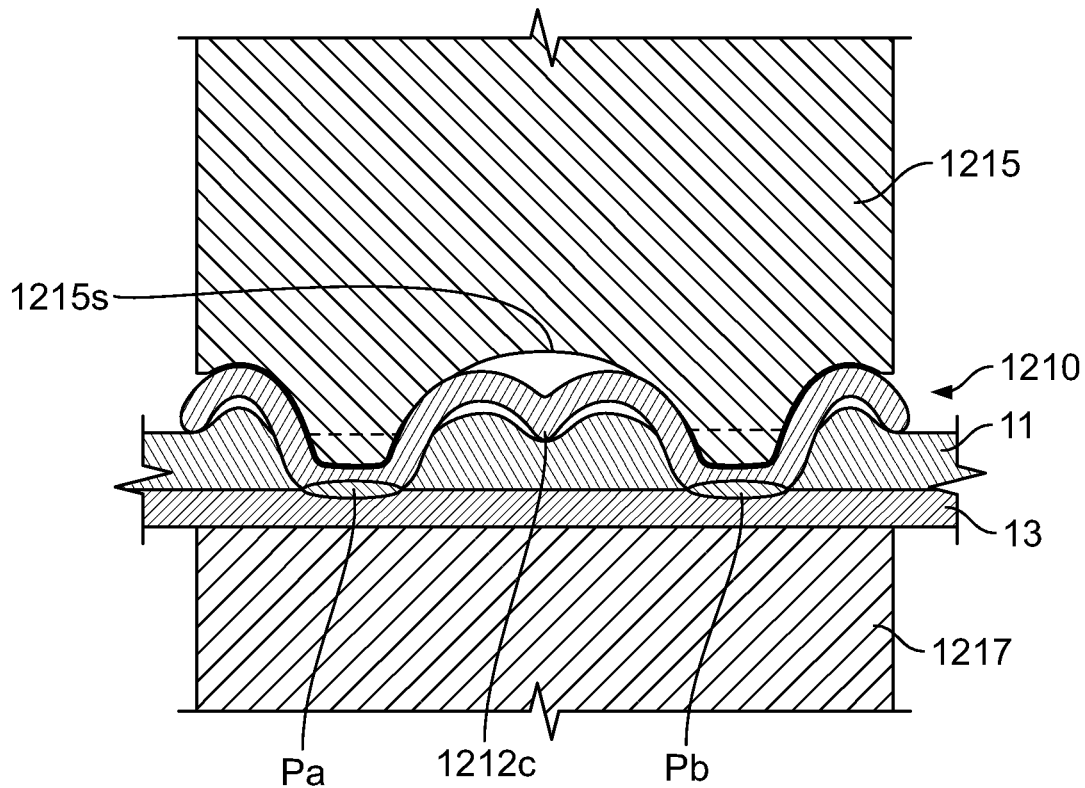
FIG. 22 is a diagrammatic, cross-sectional view of the fastener of FIG. 21 inserted through a first layer and being welded to a second layer.

FIG. 22 shows fastener 1210 inserted through first layer 11, e.g., made from aluminum and welded to layer 13, e.g., made from steel at weld zones Pa, Pb, which would have a continuous ring shape. The ring shaped weld would be distributed over a larger surface area then a disc shaped weld, as would be produced, e.g., by the use of a fastener like 410 as shown in FIG. 14a. Tip 1215 has a surface 1215s accommodating and supporting the fastener 1210 as it is heated and pressed toward tip 1217.

Figure 23:
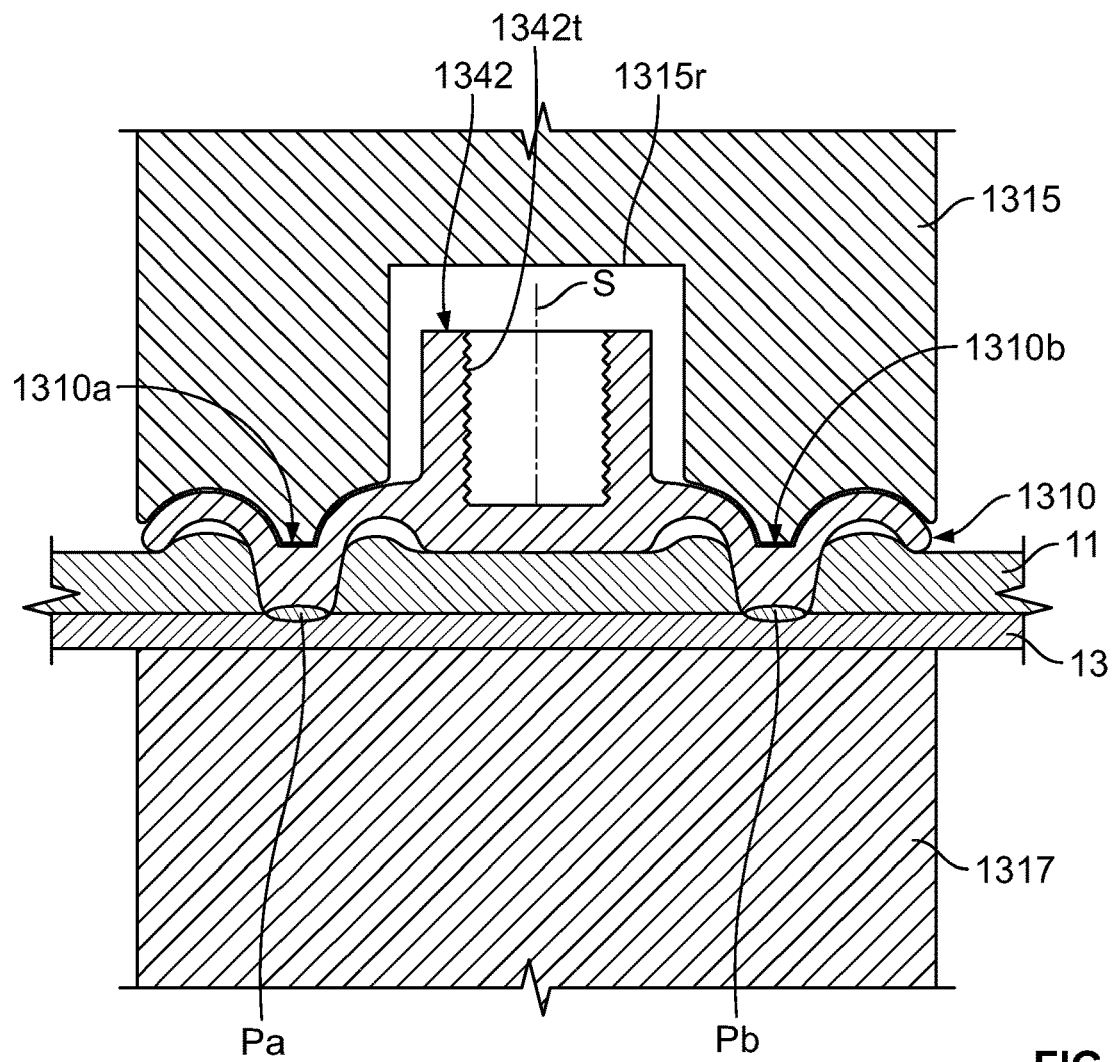
FIG. 23 is a diagrammatic, cross-sectional view of a fastener in accordance with an alternative embodiment of the present disclosure inserted through a first layer and welded to a second layer.

FIG. 23 shows a fastener 1310 in cross-section inserted through a first layer 11 and welded to a second layer 13 at weld zones Pa, Pb. As in FIG. 21, fastener 1310 is a solid of rotation about line of symmetry/rotation S, such that weld zones Pa and Pb are part of a continuous ring-shaped weld to layer 13. Fastener 1310 features a threaded, central socket 1342 having threads 1342t suitable to receive a mating threaded fastener, such as a bolt (not shown). In this manner, fastener 1310 can perform two functions, viz., retain layer 11 to 13 and provide a threaded socket permitting assembly to another member or structure (not shown) via a mating threaded fastener (not shown). Tip 1315 has a recess 1315r for accommodating the socket 1342 while welding.

Figure 24:
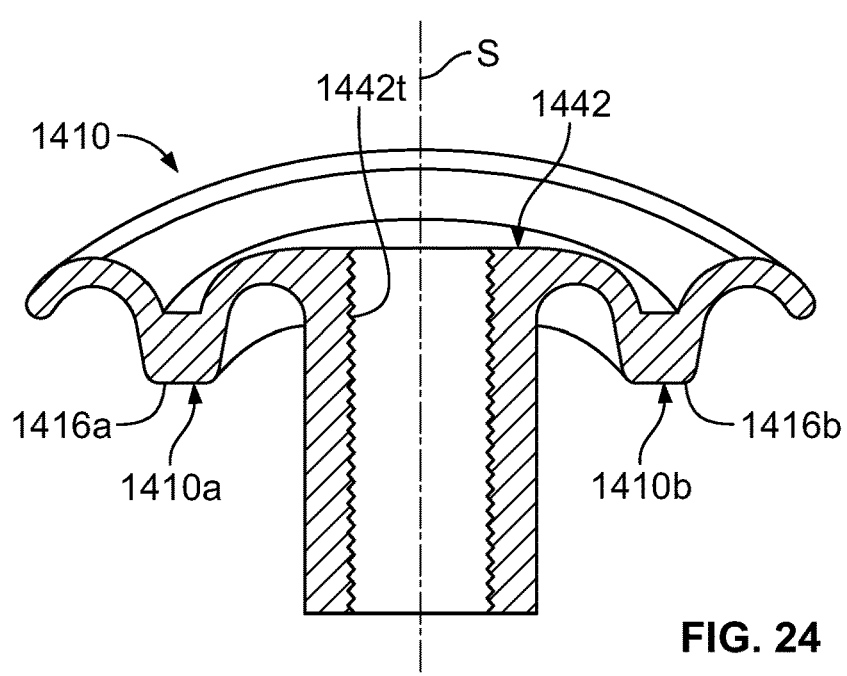
FIG. 24 is a cross-sectional view of a fastener in accordance with an alternative embodiment of the present disclosure.
Figure 25:
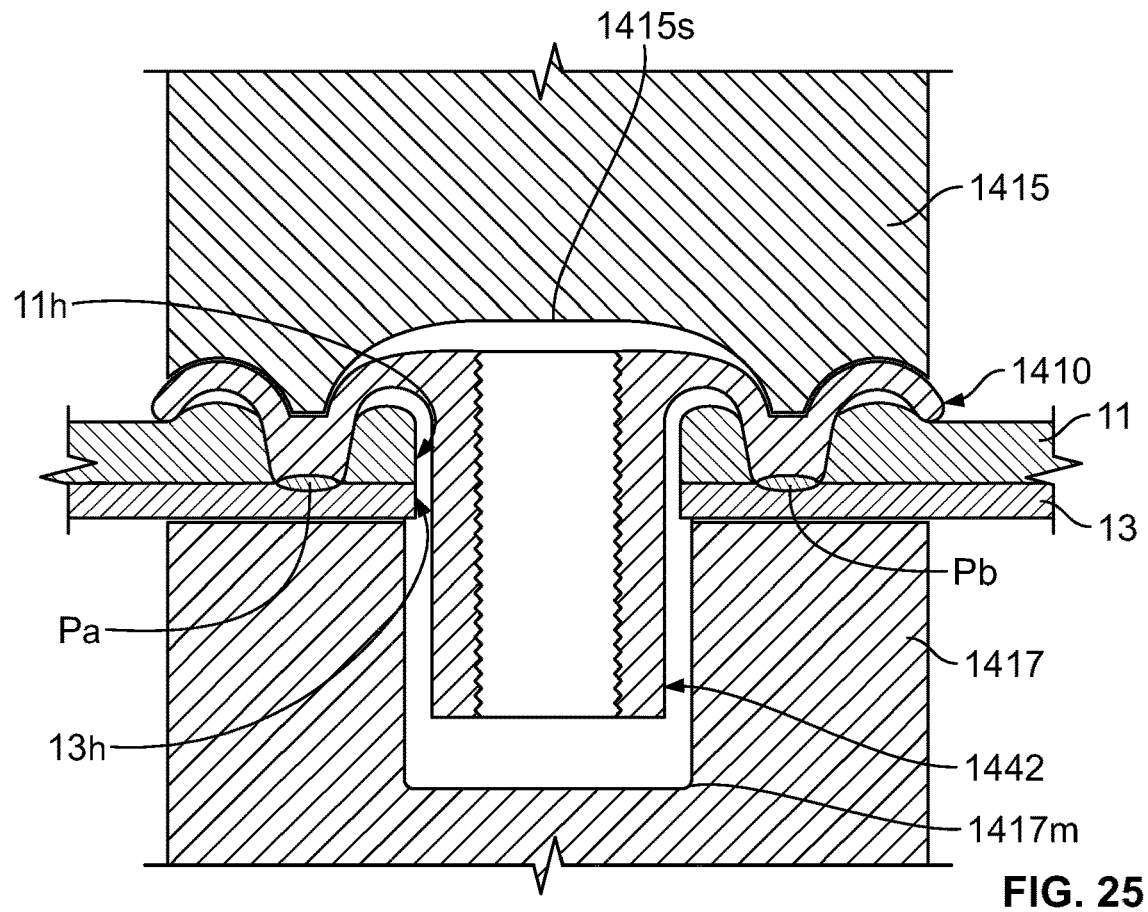
FIG. 25 is a diagrammatic, cross-sectional view of the fastener of FIG. 24 inserted through a first layer and being welded to a second layer.

FIGS. 24 and 25 show a fastener 1410 like fastener 1310, but having a socket portion 1442 with threads 1442t that is open ended, allowing a mating threaded fastener (not shown) to pass through the socket portion 1442. As shown in FIG. 25, in preparation for installation of the fastener 1410, the layers 11 and 13 are preferably drilled or otherwise provided with mating holes 11h, 13h through which the socket portion 1442 can be inserted. The penetration of the layer 11 and the welding to layer 11 can then be performed by resistance welding, as explained above. Tip 1415 has a surface 1415s for supporting the fastener 1410 as it is pressed through layer 11 and welded to layer 13. Tip 1417 has a recess 1417r accommodating the socket portion 1442 that extends through the layers 11, 13 during the welding process.

Figure 26:
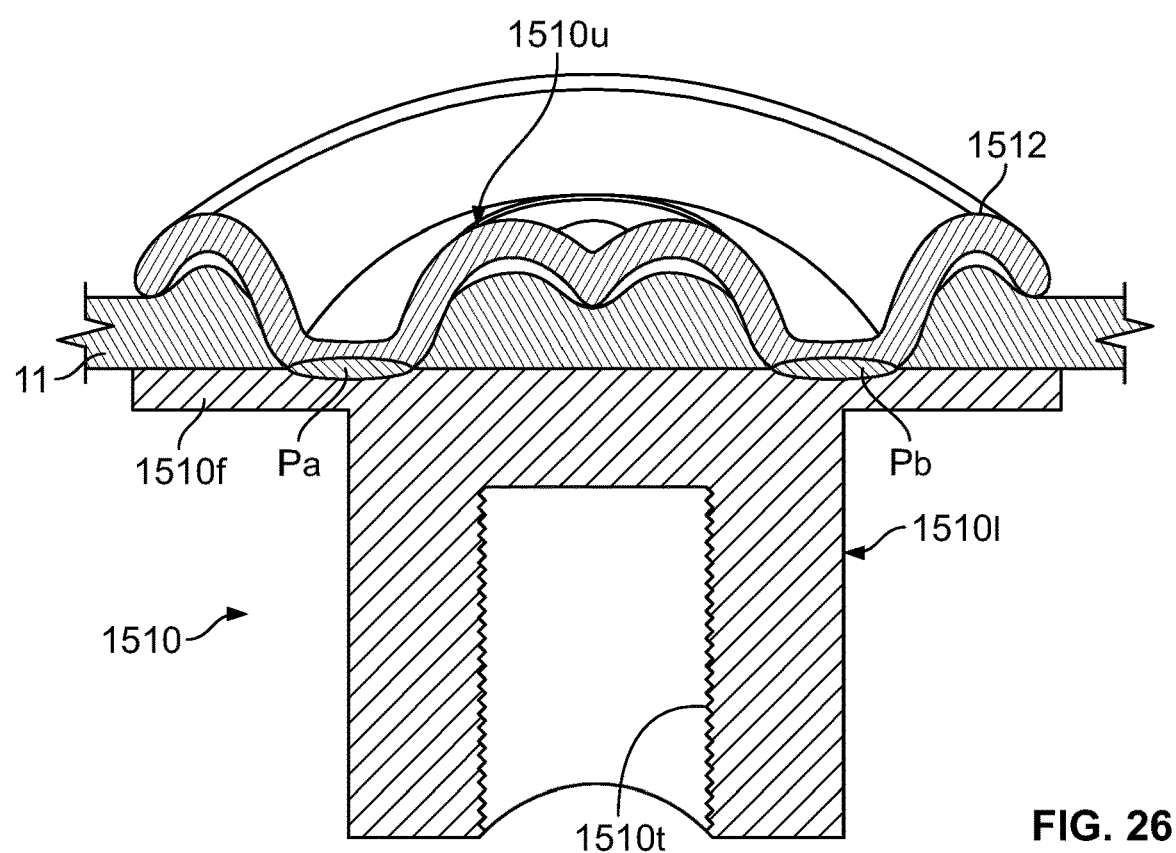
FIG. 26 is a diagrammatic, cross-sectional view of a two-part fastener in accordance with an alternative embodiment of the present disclosure, the first part inserted through a supporting layer and welded to the second part.

FIG. 26 shows a fastener 1510 having an upper part 1510u and a lower part 1510l which may be welded together to attach the fastener to a layer 11, e.g., of aluminum. The lower portion 1510l features a threaded socket 1510t. The fastener 1510 may be made from steel or titanium. The welding process is conducted as before only instead of welding to a second layer 13, the upper part 1510u is welded to the lower part 1510l after the upper part is pushed through the aluminum layer 11. As before, the weld zones Pa, Pb are a part of a ring shaped weld because the fastener 1510 is a solid of rotation. The layer 11 is captured between flange portion 1510f and cap 1512. The fastener 1510 permits a threaded socket 1510t, made from a first material, e.g., steel or titanium, to be attached to a layer 11 of dissimilar metal, e.g., aluminum or magnesium.

Figure 27:
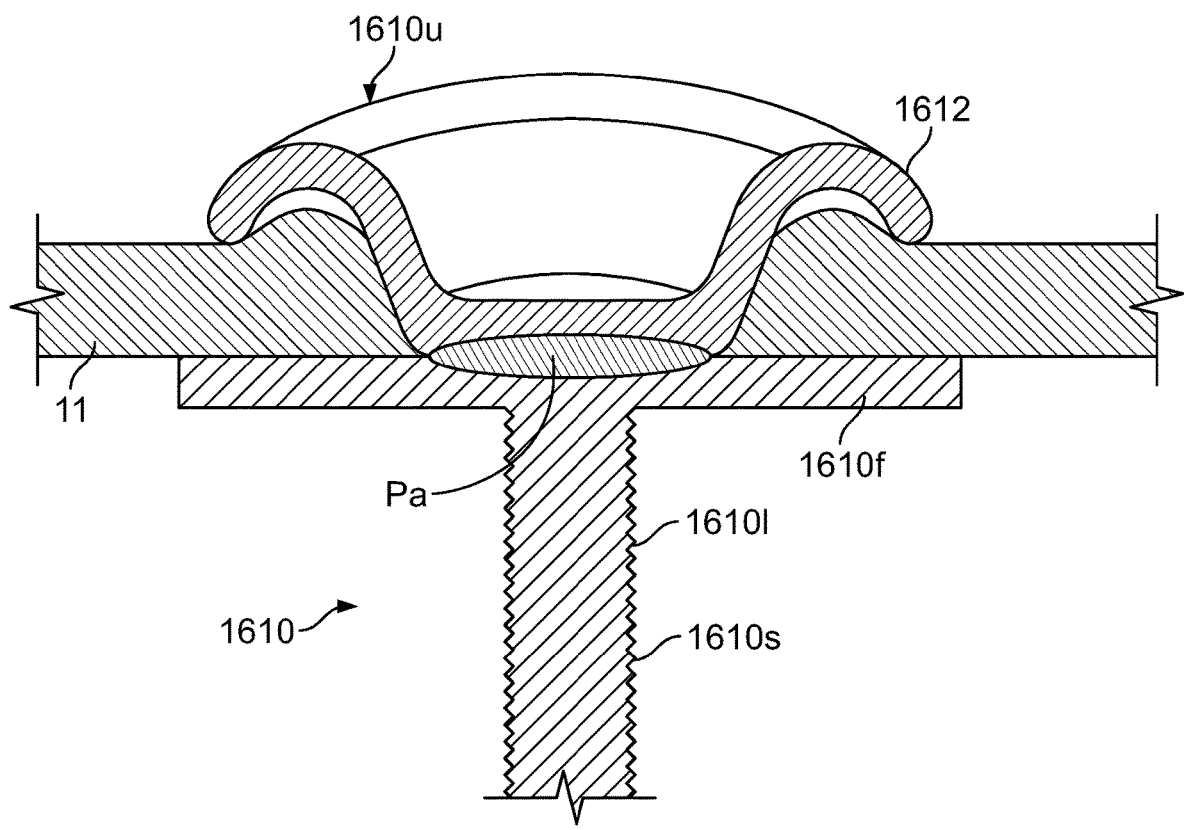
FIG. 27 is a diagrammatic, cross-sectional view of a two-part fastener in accordance with an alternative embodiment of the present disclosure, the first part inserted through a supporting layer and welded to the second part.

FIG. 27 shows a fastener 1610 having an upper part 1610u and a lower part 1610l which may be welded together to attach the fastener to a layer 11, e.g., of aluminum. The lower part 1610l features a threaded stud 1610s. The fastener 1610 may be made from steel or titanium. The welding process is conducted as before only instead of welding to a second layer 13, the upper part 1610u is welded to the lower part 1610l after the upper part is pushed through the aluminum layer 11. The weld zone Pa is approximately disk-shaped and the fastener 1610 is a solid of rotation. The layer 11 is captured between flange portion 1610f and cap 1612. The fastener 1610 permits a threaded stud 1610s, made from a first material, e.g., steel or titanium, to be attached to a layer 11 of dissimilar metal, e.g., aluminum or magnesium.

It will be understood that the embodiments described herein are merely exemplary and that a person skilled in the art may make many variations and modifications without departing from the spirit and scope of the claimed subject matter. All such variations and modifications are intended to be included within the scope of the claims.

We claim:

1. A method for fastening a first electrically conductive material to a second electrically conductive material using electrical resistance welding, comprising:
    placing the first and second materials together in physical and electrical contact, the first material having a lower melting point than the second material;
    placing an electrically conductive fastener with a cap having a downwardly extending peripheral lip and a shaft that is weldable to the second material in physical and electrical contact with the first material to form an electrically conductive stack inclusive of the fastener, the first material and the second material;
        wherein the shaft has a higher melting point than the first material;
    applying an electrical potential across the stack, inducing a current to flow through the stack and causing resistive heating, the resistive heating causing a softening of the first material to form a softened first material;
    while applying the electrical potential across the stack, piercing the softened first material with the fastener shaft by urging the fastener shaft through the softened first material toward the second material;
    after the fastener shaft contacts the second material, continuing to urge the fastener and apply electrical potential across the stack, compressing the shaft, welding the fastener to the second material and softening and collapsing the shaft until the peripheral lip contacts the first material,
        wherein the fastener cap is deformed from an initial configuration to a final configuration in which the peripheral lip captures and seals the material extruded therein from the first material during the steps of applying, urging, compressing, softening, collapsing and welding,
            wherein, in the final configuration, the fastener cap is deformed to conform to a shape of the material extruded therein,
            wherein, in the final configuration, the cap does not extend below an upper surface of the first material.

2. The method of claim 1, wherein the first material includes at least one of aluminum, copper, magnesium and alloys thereof, the second material includes at least one of steel, titanium, alloys thereof and Inconel and the fastener is made from at least one of steel, titanium, alloys thereof and Inconel.

3. The method of claim 1, wherein the second material is a second fastener and wherein the fastener and second fastener clamp the first material there between.

4. The method of claim 1, further comprising the step of applying a corrosion barrier between at least one of the fastener, the first material and the second material prior to the step of applying.

5. The method of claim 1, wherein the fastener has a capability to fasten a range of thicknesses of the first material to the second material by deforming to a selected degree during the step of welding.

6. The method of claim 1, further comprising stamping the fastener from a sheet prior to the step of placing the fastener.

7. The method of claim 1, wherein the stack includes a plurality of layers of material having a melting point less than a melting point of the second material and less than a melting point of the fastener.

8. The method of claim 1, wherein the cap has a radiused surface and wherein the electric potential is applied by electrodes, at least one of which has a tip with a shape that is complementary to the radiused surface.

9. The method of claim 1, further comprising a step of tempering the weld after the step of forming the weld.

10. The method of claim 9, wherein a compressive force applied during the step of tempering is of a magnitude between 400 to 1000 pounds and the current is in a range of 3,000 to 12,000 Amperes.

11. A fastener for fastening a first electrically conductive material to a second electrically conductive material using electrical resistance welding, comprising:
    a cap with a curved peripheral lip, and
    a shaft extending from the cap and having an end distal to the cap,
        wherein the fastener, when placed in a stack including the first and second electrically conductive materials and subjected to an electrical potential applied across the stack, is configured to conduct an electrical current that passes through the stack to cause resistive heating and soften the first material,
        wherein the first material has a lower melting point than the second material,
        wherein the shaft is capable of piercing the first material and welding to the second material at the end, and
        wherein the cap is configured to be deformed from an initial configuration to a final configuration in which the peripheral lip captures and seals material extruded therein from the first material,
            wherein, in the final configuration, the cap is conformed to a shape of the material extruded therein.

12. The fastener of claim 11, wherein the shaft is hollow, and wherein the shaft has a cross sectional shape that diverges from a tip at the end to cap.

13. The fastener of claim 11, wherein the fastener has a varying wall thickness.

14. The fastener of claim 11, wherein the cap has a radiused surface.

15. The fastener of claim 11, wherein the fastener has at least one spline extending from an exterior surface thereof.

16. The fastener of claim 11, wherein the fastener is asymmetric about a rotational axis.

17. The fastener of claim 11, wherein the fastener has two diverging cross section portions conjoined at a central downwardly directed cusp, the end being ring shaped.

18. The fastener of claim 11, wherein the fastener has two diverging cross section portions conjoined at a central threaded fastener portion.

19. A fastener for fastening a first electrically conductive material to a second electrically conductive material using electrical resistance welding, comprising:
    a cap having a downwardly extending peripheral lip, and
    a shaft extending from the cap and having an end distal to the cap, the shaft having a hollow portion that diverges in a direction from the end to the cap,
        wherein the fastener, when placed in a stack including the first and second electrically conductive materials and subjected to an electrical potential applied across the stack, is configured to conduct an electrical current that passes through the stack to cause resistive heating and soften the first material, wherein the first material has a lower melting point than the second material, wherein the shaft is capable of piercing the first material and welding to the second material at the end, and wherein the cap is configured to be deformed from an initial configuration to a final configuration in which the peripheral lip captures and seals material extruded therein from the first material, wherein, in the final configuration, the cap is conformed to a shape of the material extruded therein.

* * * * *